US011469998B2

(12) United States Patent
Sanghvi et al.

(10) Patent No.: US 11,469,998 B2
(45) Date of Patent: Oct. 11, 2022

(54) DATA CENTER TENANT NETWORK ISOLATION USING LOGICAL ROUTER INTERCONNECTS FOR VIRTUAL NETWORK ROUTE LEAKING

(71) Applicant: Juniper Networks, Inc., Sunnyvale, CA (US)

(72) Inventors: Parag Sanghvi, Fremont, CA (US); Ankur Tandon, Sunnyvale, CA (US); Jacopo Pianigiani, Cupertino, CA (US); Atul S Moghe, San Jose, CA (US); Patrik Bok, Park Ridge, IL (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 17/247,858

(22) Filed: Dec. 28, 2020

(65) Prior Publication Data
US 2021/0377164 A1 Dec. 2, 2021

Related U.S. Application Data

(60) Provisional application No. 63/030,657, filed on May 27, 2020.

(51) Int. Cl.
*H04L 45/586* (2022.01)
*H04L 45/02* (2022.01)
(Continued)

(52) U.S. Cl.
CPC ............ *H04L 45/586* (2013.01); *H04L 45/02* (2013.01); *H04L 45/04* (2013.01); *H04L 45/56* (2013.01); *H04L 47/20* (2013.01); *H04L 49/70* (2013.01)

(58) Field of Classification Search
CPC ....... H04L 45/586; H04L 45/02; H04L 45/04; H04L 45/56; H04L 47/20; H04L 49/70; H04L 45/42; H04L 45/64
See application file for complete search history.

(56) References Cited

U.S. PATENT DOCUMENTS 9,571,394 B1 2/2017 Sivaramakrishnan et al.
9,787,559 B1 * 10/2017 Schroeder ............... H04L 43/55
(Continued)

FOREIGN PATENT DOCUMENTS

CN 101107614 A * 1/2008 ............. G06F 21/31
WO 2013184846 A1 12/2013

OTHER PUBLICATIONS

Extended Search Report from counterpart European Application No. 21163797.0 dated Sep. 28, 2021, 8 pp.
(Continued)

*Primary Examiner* — Mohamed A Kamara
(74) *Attorney, Agent, or Firm* — Shumaker & Sieffert, P.A.

(57) ABSTRACT

Network controllers are described that enable creation of logical interconnects between logical routers of different, isolated virtual networks and for auto-generation and deployment of routing policies to control "leaking" of select routes amongst the different virtual networks. In one example, a network controller includes a memory and processing circuitry configured to identify a source logical router of a first virtual network and a destination logical router of a second virtual network implemented on one or more physical devices of a switch fabric, form a policy defining one or more rules for controlling leaking of one or more of the routes through a logical router interconnect from the source logical router to the destination logical router, and push the policy to the one or more physical devices of the
(Continued)

switch fabric for application to communications through the logical router interconnect.

15 Claims, 12 Drawing Sheets

(51) Int. Cl.
*H04L 45/00* (2022.01)
*H04L 47/20* (2022.01)
*H04L 49/00* (2022.01)

(56) References Cited

U.S. PATENT DOCUMENTS

| | | | |
|---|---|---|---|
| 10,291,497 B2 | 5/2019 | Mehta et al. | |
| 10,742,690 B2 | 8/2020 | Miriyala et al. | |
| 11,245,621 B2 * | 2/2022 | Chanda | H04L 45/586 |
| 2010/0329252 A1 * | 12/2010 | Mulamalla | H04L 45/00 370/390 |
| 2016/0134520 A1 * | 5/2016 | Kapadia | H04L 12/4633 370/392 |
| 2018/0367388 A1 | 12/2018 | Pani et al. | |

OTHER PUBLICATIONS

"OpenFlow Switch Specification," Version 1.1.0 Implemented (Wire Protocol 0x02), Open Networking Foundation, Feb. 28, 2011, 58 pp.

"[Junos] What is the use of RIB groups and how are they used?" version 6.0, Juniper Networks, Inc., Apr. 14, 2020, available at https://kb.juniper.net/InfoCenter/index?page=content&id=kb16133&actp=METADATA (last accessed Oct. 29, 2020), 5 pp.

"rib-groups" Juniper Networks, Inc., TechLibrary, Junos OS, Protocol-Independent Routing Properties User Guide, Sep. 28, 2020, available at https://www.juniper.net/documentation/en_US/junos/topics/reference/configuration-statement/rib-groups-edit-routing-options.html (last accessed Oct. 29, 2020), 2 pp.

Mockapetris, P. "Domain Names—Concepts and Facilities", Network Working Group, RFC 1034, Nov. 1987, 55 pp.

Mockapetris, P. "Domain Names—Implementation and Specification", Network Working Group, RFC 1035, Nov. 1987, 55 pp.

Droms, R. "Dynamic Host Configuration Protocol", Network Working Group, RFC 2131, Mar. 1997, 45 pp.

"Tiers in Virtual Chassis Fabric" Juniper Networks, Inc. Oct. 30, 2013, available at http://forums.juniper.net/t5/Data-Center-Technologists/Tiers-in-Virtual-Chassis-Fabric/ba-p/214765 (last accessed Oct. 29, 2020), 7 pp.

Enns et al., "Network Configuration Protocol (NETCONF)," Internet Engineering Task Force (IETF), RFC 6241, Jun. 2011, 114 pp.

Response to Extended Search Report dated Sep. 28, 2021, from counterpart European Application No. 21163797.0 filed Jun. 1, 2022, 25 pp.

\* cited by examiner

| | | CONTRAIL COMMAND | | | | ◘ | DEFAULT ▸ | 🖶 ADMIN ▸ | 👤 ADMIN ▸ | ⊙ |
|---|---|---|---|---|---|---|---|---|---|---|
| Q SEARCH | | OVERLAY ▸ ROUTING | | | | | | | | |
| ★ FAVORITES | ⌄ | NETWORK ROUTE TABLES | ROUTING POLICIES | INTERFACE ROUTE TABLES | ROUTE AGGREGATES | | | | | |
| MONITORING | ⌄ | ROUTING POLICIES | | | | | Q | ⟳ | 🗑 | ADD |
| INFRASTRUCTURE | ⌄ | ☐ NAME | TYPE | | TERMS | | | | | |
| OVERLAY | ⌄ | ▸☐ TEST1_PARAG | NETWORK DEVICE | FROM ROUTE FILTER [2.2.2.2/24 EXACT] THEN ACTION DEFAULT | | | | | | ⋮ |
| WORKLOADS | ⌄ | ▸☐ NEW_RPDCI_S34_S36 | NETWORK DEVICE | FROM ROUTE FILTER [80.0.0.0/24 EXACT, 90.0.0.0/24 LONGER, 91.0.0.0/24 ORLONGER, 34.0.0.0/6 ORLONGER] THEN ACTION [ACCEPT] | | | | | | ⋮ |
| IAM | ⌄ | ▸☐ RPDCI_S25_S26-V2 | NETWORK DEVICE | FROM ROUTE FILTER [25.25.25.0/24 EXACT, 26.26.26.0/24 EXACT] THEN ACTION [ACCEPT] | | | | | | ⋮ |
| SERVICES | ⌄ | ▸☐ RPDCI_S73S74 | VIRTUAL ROUTER | FROM ROUTE FILTER [73.73.73.0/24 EXACT, 74.74.74.0/31 UPTO] THEN ACTION [ACCEPT] | | | | | | ⋮ |
| SECURITY | ⌄ | ▸☐ RPDCI_S34_S36 | VIRTUAL ROUTER | FROM ROUTE FILTER [34.34.34.0/24 EXACT, 36.36.36.0/24 EXACT, 34.34.34.0/31 UPTO] THEN ACTION [ACCEPT] | | | | | | ⋮ |
| DEBUG | ⌄ | ▸☐ RPDCI_S25_S26 | NETWORK DEVICE | FROM FAMILY EVPN NLRI [1,10] THEN ACTION DEFAULT FROM PROTOCOL [BGP] ROUTE FILTER [25.25.25.0/24 EXACT, 26.26.26.0/24 EXACT... | | | | | | ✎🗑 |
| DNS | ⌄ | | | | | | | | | |

```
[edit routing-options]
rib-groups {
    LR_SRC-to-LR_DEST {
        import-rib [ LR_SRC.inet.0 LR_DEST.inet.0 ];    # Copy routes between tables, first is source followed to one or more destinations
        import-policy LR_SRC-to-LR_DEST-rib;             # Optional policy to filter routes. If none exist, all routes are copied
    }
}

[edit policy-options]
policy-statement LR_SRC-to-LR_DEST-rib {    # Name of Policy
    term 1 {                                 # Name of TERM in policy, common 1
        from {                               # filter specific VNI or per policy extracted route-filter
            route-filter 20.2.2.0/24 exact;
        }
        then accept;
    }
    term reject_else {
        then reject;
    }
}

[edit routing-instances LR_SRC routing-options]    # this ensures copy of directly connected/interface routes to LR_DEST
interface-routes {
    rib-group inet LR_SRC-to-LR_DEST;
}

[edit routing-instances LR_SRC routing-options]    # this ensures copy of static routes to LR_DEST
static {
    rib-group inet LR_SRC-to-LR_DEST;
}

[edit routing-instances LR_SRC protocols bgp family inet unicast]    # this is to ensure BGP routes.
rib-group LR_SRC-to-LR_DEST;
```

FIG. 7A

```
# on Destination LR Device
[edit]
policy-options {
  policy-statement _controll_rp_wf_<LR Interconnect name>_{
    term 1 {
      from community _controll_rp_inter_<LR Interconnect Name>;    # Unique name for community that marks given routes
            route-filter 40.2.0.0/17 orlonger;                      # filter specific VNI or per policy extracted route-filter
      then accept;
    }
  }
}
community _controll_rp_inter_<LR Interconnect Name> members target:1.1.1.1:1;   # Unique name for community that marks given routes routing-instances {
  LR_DEST {
    vrf-import _controll_rp_wf_<LR Interconnect name>;    # apply of the policy in vrf-import
  }
}
```

FIG. 7B

| ≡ | ◊ CONTRAIL COMMAND | OVERLAY ▶ INTERCONNECTS | | | ◊ | ⊕ DEFAULT ▶ | ⚙ ADMIN ▶ | ⌀ | & ADMIN ▶ | ⊘ |
|---|---|---|---|---|---|---|---|---|---|---|
| Q SEARCH | | DATA CENTER INTERCONNECT | LR INTERCONNECTS | | | | | | | |
| ★ FAVORITES ▸ | | LR INTERCONNECTS | | | | | Q ⟲ | ⬚ | CREATE | |
| MONITORING ▸ | | ☐ NAME | DESCRIPTION | SOURCE LR | VN / ROUTING POLICY | DESTINATION LR | | | | |
| INFRASTRUCTURE ▸ | | ▸ ☐ DCI_VRF_VN_1 | | LR_s31s32s33 | VN31<br>VN33 | LR_s62 | | | ⋮ | |
| OVERLAY ▸ | | ▸ ☐ DCI_RIB_VRF_RP_1 | | LR_s73s74s75 | RPdci_s25_s26 | LR_s84<br>LR_s83 | | | ⋮ | |
| WORKLOADS ▸ | | ▸ ☐ DCI_RIB_VRF_VN_1 | | LR_s70s71s72 | VN70_71 | LR_s82<br>LR_s81 | | | ⋮ | |
| IAM ▸ | | ▸ ☐ DCI_VRF_RP_1 | | LR_s34s35s36 | NEW_RPdci_s34_s36 | LR_s64 | | | ⋮ | |
| SERVICES ▸ | | ▸ ☐ DCI_RIB_RP_1 | | LR_s24s25s26 | RPdci_s25_s26-V2 | LR_s54<br>LR_s53 | | | ⋮ | |
| SECURITY ▸ | | ▸ ☐ DCI_RIB_VN_1 | | LR_s21s22s23 | VN22<br>VN21 | LR_s52<br>LR_s51 | | | ⋮ | |
| DEBUG ▸ | | | | | | | | | | |
| DNS ▸ | | | | | | | | | | |
| | | NO ITEMS SELECTED | | | | | | | | |

DATA CENTER TENANT NETWORK ISOLATION USING LOGICAL ROUTER INTERCONNECTS FOR VIRTUAL NETWORK ROUTE LEAKING

This application claims the benefit of U.S. Provisional Application No. 63/030,657 filed 27 May 2020, the entire content of which is herein incorporated by reference.

TECHNICAL FIELD

This disclosure relates to computer networks.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as networking and storage systems, redundant power supplies, and environmental controls. In most data centers, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Packet forwarding devices of data centers (e.g., routers & switches) forming the switch fabric of the data center are often arranged according to an interconnected topology, such as an Internet protocol Clos (IP-Clos) network. Data centers provide services for multiple tenants, and generally provide tenant isolation to prevent data of one tenant from being accessible to other tenants. For example, an IP-Clos packet switching network of the data center may be configured according to Ethernet VPN Virtual Extensible LAN (EVPN VxLAN) where network traffic associated with each tenant of the data center traverses a separate virtual network.

SUMMARY

In general, this disclosure describes techniques and configurations that enable network controllers to auto-generate routing policies for deployment to physical devices (e.g., physical routers and/or switches) that operate to provide packet forwarding via the switch fabric of an interconnected topology of a data center. In particular, the techniques may be used to enable virtual network controllers to generate routing policies to provide fine-grain control of route leaking between virtual routing and forwarding tables (e.g., VRFs) utilized by the physical packet forwarding devices for providing traffic isolation using different virtual networks over a data center switch fabric.

Each of the VRFs may, as described herein, be viewed as a logical router providing packet switching/routing operations on a given physical network device for a different virtual network. According to techniques of this disclosure, example virtual network controllers are described that provide a user interface that presents administrator one or more options by which to define logical "interconnects" between the various logical routers (LRs) operating on switches of the data center switch fabric. Further, for any intra-fabric LR interconnects specified in the administrator's user input, virtual network controller automatically generates routing policies and deploys the policies to the LRs operating on the physical devices within the switch fabric to cause the LRs to selectively "leak" routes amongst their respective virtual networks, i.e., share specific routing information even though the VRFs may not be peer logical routers within the same routing domain and are otherwise operate in different virtual networks that are logically isolated from each other in terms of routing and network domains. In this way, the virtual network controller may automatically generated configuration information and policies to establishes communication interconnects between specific VRFs and precisely control that leaking (sharing) of specific routes between the otherwise isolated VRFs. As such, the techniques provide fine-grain control over the leaking of routes in a unidirectional way from a single source LR to one or more destination LR(s) based on the administer-provided user input.

In one example, the virtual network controller generates and deploys policies specifying routing groups (e.g., RIB groups) to control leaking of routes from a source LR to multiple destination LRs where the source LR and the destination LRs are deployed on the same physical device within the switch fabric. In addition, the virtual network control automatically generates and deploys BGP export and import policies to control leaking of routes between from a source LR to one or more destination LRs where the source LR and the destination LR(s) are deployed on the different physical devices within the switch fabric.

In various examples, the virtual network controller is configured to enable the administrator to provide the routing information either by configuring routing policies for the physical devices or by selecting lists of tenant virtual network subnets connected via the switch fabric. If the administrator selects a tenant virtual network to use as a routing policy template, the virtual network controller leaks the routes that exist in in the source LR. Some network devices of a data center may provide physical network functions (PNFs), such as deep packet inspection and/or other security functions. In order to provide PNFs to inter-tenant communication, such devices are typically configured using device-specific and/or vendor-specific configuration procedures.

In one example, this disclosure describes a method that includes identifying, by a virtual network controller, a source logical router and a destination logical router implemented on one or more physical devices of a switch fabric, wherein the source logical router maintains routing information specifying routes for a first virtual network and the destination logical router maintains routing information specifying routes for a second virtual network; forming, by the virtual network controller, a logical router interconnect between the source logical router and the destination logical router; forming, by the virtual network controller, a policy defining one or more rules for controlling leaking of one or more of the routes through the logical router interconnect from the source logical router of the first virtual network to the destination logical router of the second virtual network; and pushing, by the virtual network controller, the policy to the one or more physical devices of the switch fabric for application to communications through the logical router interconnect.

In another example, this disclosure describes a network controller that includes a memory and processing circuitry configured to: identify a source logical router and a destination logical router implemented on one or more physical devices of a switch fabric, wherein the source logical router maintains routing information specifying routes for a first virtual network and the destination logical router maintains routing information specifying routes for a second virtual network; form a logical router interconnect between the source logical router and the destination logical router; form a policy defining one or more rules for controlling leaking of one or more of the routes through the logical router interconnect from the source logical router of the first virtual network to the destination logical router of the second virtual network; and push the policy to the one or more physical devices of the switch fabric for application to communications through the logical router interconnect.

In another example, this disclosure describes a computer-readable storage medium comprising instructions that configure processing circuitry of a network controller to: identify a source logical router and a destination logical router implemented on one or more physical devices of a switch fabric, wherein the source logical router maintains routing information specifying routes for a first virtual network and the destination logical router maintains routing information specifying routes for a second virtual network; form, by the virtual network controller, a logical router interconnect between the source logical router and the destination logical router; form, by the virtual network controller, a policy defining one or more rules for controlling leaking of one or more of the routes through the logical router interconnect from the source logical router of the first virtual network to the destination logical router of the second virtual network; and push, by the virtual network controller, the policy to the one or more physical devices of the switch fabric for application to communications through the logical router interconnect.

The details of one or more examples are set forth in the accompanying drawings and the description below. Other features, objects, and advantages will be apparent from the description and drawings, and from the claims.

BRIEF DESCRIPTION OF DRAWINGS

FIG. 5 is a screenshot illustrating a UI-based functionality for routing policy configuration, including illustrating various "from" and "then" clauses for different device types with respect to routing policy selection-based LR interconnect setup, in accordance with aspects of this disclosure.

FIG. 6 is a screenshot illustrating an example a UI presented by a virtual network controller which enables a user to define physical device-type routing policy, including specifying FROM and THEN policy-statement options to be applied by the physical devices of the switch fabric to control route leaking.

FIGS. 7A, 7B are screenshots illustrating example configuration data specifying policies that a virtual network controller of this disclosure may generate and deploy the logical routers of different virtual networks to control route leaking between the logical routers.

FIG. 8 is a screenshot illustrating an LR interconnect within the same fabric for route leaking according to aspects of this disclosure.

FIG. 9 illustrates an intra-fabric LR interconnect set up using a VN selection.

FIG. 10 is a screenshot illustrating routing policy selection-based LR interconnect setup, according to aspects of this disclosure.

DETAILED DESCRIPTION

Figure 1:
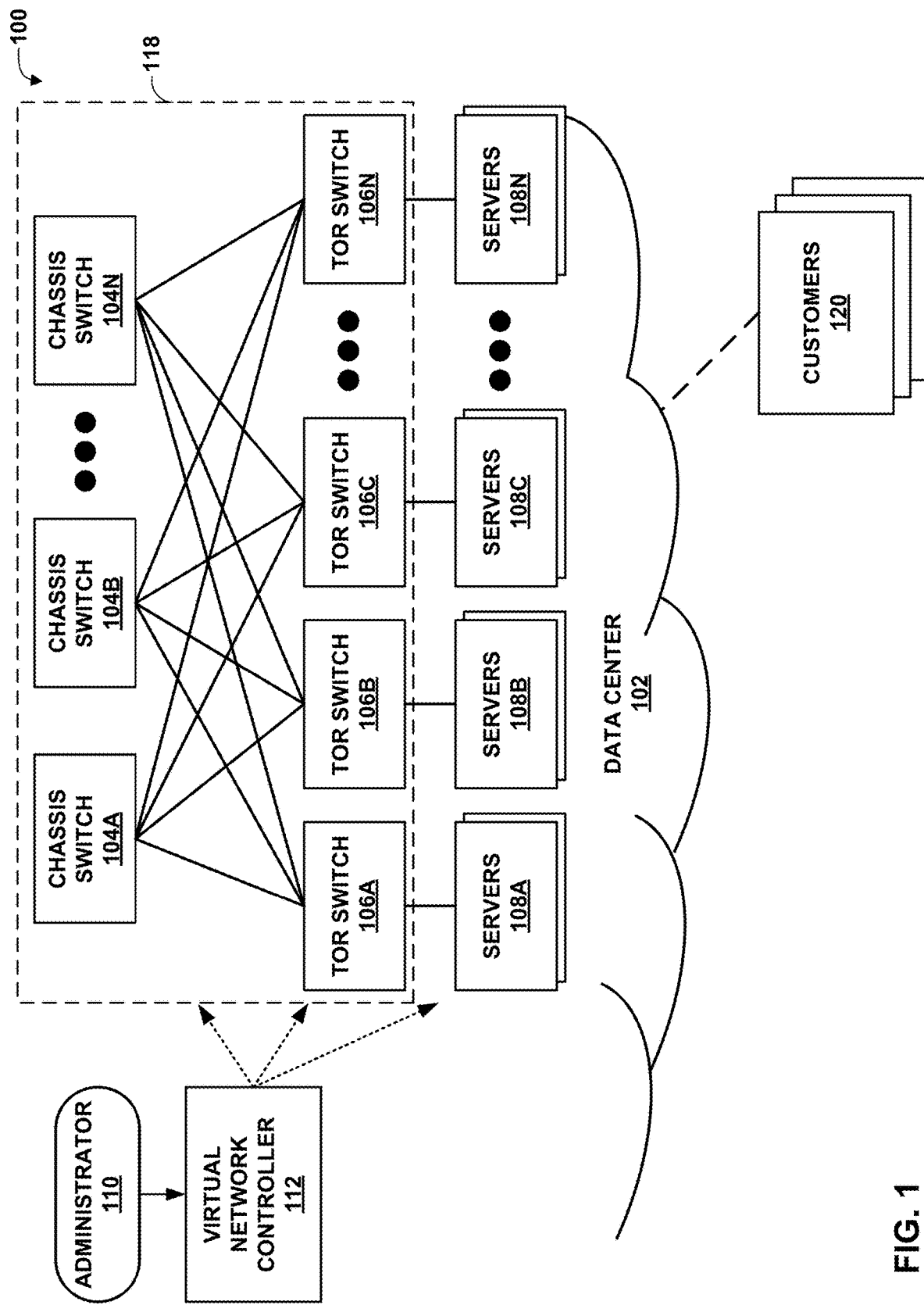
FIG. 1 is a block diagram illustrating an example network including a data center in which examples of the techniques described herein may be implemented.

FIG. 1 is a block diagram illustrating an example network 100 including a data center 102 in which examples of the techniques described herein may be implemented. In general, data center 102 provides an operating environment for applications and services for customers 120 coupled to the data center, e.g., by a service provider network (not shown). Data center 102 may, for example, host infrastructure equipment, such as networking and storage systems, redundant power supplies, and environmental controls. A service provider network that couples customers 120 to data center 102 may be coupled to one or more networks administered by other providers, and may thus form part of a large-scale public network infrastructure, e.g., the Internet.

In some examples, data center 102 represents one of many geographically distributed network data centers. As illustrated in the examples of FIG. 1, data center 102 may be a facility that provides network services for customers 120. Customers 120 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 102 may be individual network servers, network peers, or otherwise.

In this example, data center 102 includes a set of storage systems and application servers 108A-108N (servers 108) interconnected via interconnected topology 118, which may comprise a switch fabric provided by one or more tiers of physical network switches and routers. Servers 108 may be respective bare metal servers (BMSs). In the examples of FIG. 1, interconnected topology 118 includes chassis switches 104A-104N (chassis switches 104) and top-of-rack (TOR) switches 106A-106N (TOR switches 106). For instance, chassis switches 104 may form spine nodes of a spine and leaf topology, while TOR switches 106 may form leaf nodes of the spine and leaf topology. It should be understood that other topologies may be used in other examples, as discussed in greater detail below. Servers 108 provide execution and storage environments for applications and data associated with customers 120 and may be physical servers, virtual machines or combinations thereof.

In general, interconnected topology 118 represents layer two (L2) and (in some examples) layer three (L3) switching and routing components that provide point-to-point connectivity between servers 108. In one example, interconnected topology 118 comprises a set of interconnected, high-performance yet off-the-shelf packet-based routers and switches that implement industry standard protocols. In one example, interconnected topology 118 may comprise off-the-shelf components that provide Internet Protocol (IP) over an Ethernet (IPoE) point-to-point connectivity.

In FIG. 1, virtual network controller 112 provides a high-level controller for configuring and managing routing and switching infrastructure of data center 102. Example details of virtual network controller 112 operating in conjunction with other devices of network 100 or other software-defined networks can be found in International Application Number PCT/US2013/044378 filed on 6 May 2013 and in U.S. patent application Ser. No. 14/226,509 filed on 26 Mar. 2014 (now issued as granted U.S. Pat. No. 9,571, 394), the entire contents of each of which are incorporated by reference.

Virtual network controller 112 may represent, for example, a software-defined network (SDN) controller that communicates and manages the devices of data center 102 using an SDN protocol, such as the OpenFlow protocol. Additional details regarding OpenFlow are found in "OpenFlow Switch Specification version 1.1.0", OpenFlow Consortium, February 2011, the entirety of which is incorporated by reference herein. In addition, virtual network controller 112 may communicate with the routing and switching infrastructure of data center 102 using other interface types, such as a Simple Network Management Protocol (SNMP) interface, a path computation element protocol (PCEP) interface, a Device Management Interface (DMI), a CLI, an Interface to the Routing System (IRS), or any other node configuration interface.

Virtual network controller 112 provides a logically—and in some cases, physically—centralized controller for facilitating operation of one or more virtual networks within data center 102 in accordance with examples of this disclosure. In some examples, virtual network controller 112 may operate according to configuration input received from network administrator 110. Additional information regarding virtual network controller 112 operating in conjunction with other devices of data center 102 can be found in International Application Number PCT/US2013/044378 filed on 5 Jun. 5, 2013, entitled PHYSICAL PATH DETERMINATION FOR VIRTUAL NETWORK PACKET FLOWS, there entire content of which is hereby incorporated by reference.

Although not shown in FIG. 1, data center 102 may also include one or more additional switches, routers, hubs, gateways, security devices such as firewalls, intrusion detection, and/or intrusion prevention devices, computer terminals, laptops, printers, databases, wireless mobile devices such as cellular phones or personal digital assistants, wireless access points, bridges, cable modems, application accelerators, or other network devices. In general, network traffic within interconnected topology 118, such as packet flows between servers 108, can traverse the physical network of interconnected topology 118 using many different physical paths. For example, a "packet flow" can be defined by values used in a header of a packet, such as the network "five-tuple," i.e., a source IP address, destination IP address, source port and destination port that are used to route packets through the physical network, and a communication protocol. For example, the protocol element of the 5-tuple specifies the communications protocol, such as TCP or UDP, and the Source port and Destination port elements refer, respectively, to source and destination ports of the connection.

A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may represent a set of all PDUs transmitted in a Transmission Control Protocol (TCP) connection, a set of all PDUs sourced by a particular MAC address or IP address, a set of all PDUs having the same VLAN tag, or a set of all PDUs received at the same switch port.

As shown in the examples of FIG. 1, each of TOR switches 106 is communicatively coupled to each of chassis switches 104 in interconnected topology 118. Similarly, in this example, each of chassis switches 104 is communicatively coupled to each of TOR switches 106. TOR switches 106 and chassis switches 104 are described herein as physical devices that collectively form a "switch fabric" for data center 102, i.e., interconnected topology 118 of routing/switching network devices. Accordingly, the number of paths from any one of TOR switches 106 to any other one of TOR switches 106 is equal to the number of chassis switches 104, in this example. Although the letter "N" is used to represent undefined numbers of both TOR switches 106 and chassis switches 104, it should be understood that there may be a different number of TOR switches 106 than chassis switches 104.

Servers 108 may correspond to respective tenants of data center 102. For example, servers 108A may correspond to a first tenant, servers 108B may correspond to a second tenant, and so on. Interconnected topology 118 allows for inter-tenant communication, e.g., between servers 108A-108N. In accordance with the techniques of this disclosure, virtual network controller 112 may be configured to automatically configure one or more service devices to provide physical network functions (PNFs) to inter-tenant communications. The service devices may be, for example, TOR switches 106, chassis switches 104, or other devices connected thereto. In general, the service devices may be any International Organization for Standardization (ISO) Open Systems Interconnection (OSI) model Layer 3 Virtual Extensible LAN (VxLAN) Network Identifier (VNI) capable devices, which may be configured in active-active mode.

Interconnected topology 118 may be implemented in various ways, and does not necessarily include the devices or arrangement shown in FIG. 1. In one example, interconnected topology 118 is implemented as a spine and leaf topology. In such an example, chassis switches 104 are configured as spine switches (e.g., Layer 3 switches) and TOR switches 106 are configured as leaf switches.

Figure 2:
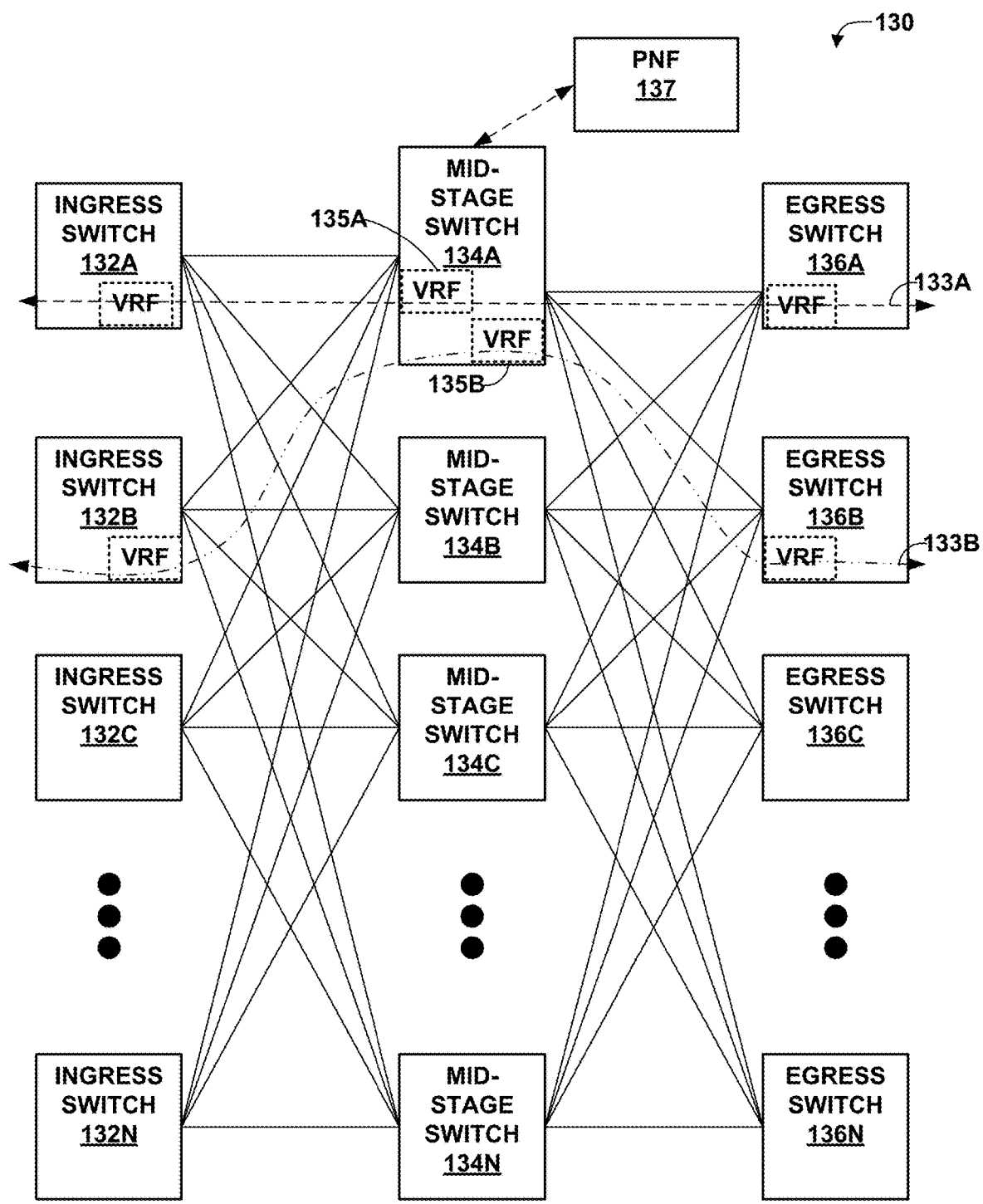
FIG. 2 is a block diagram illustrating an example Clos network.

In another example, interconnected topology 118 is implemented as a Clos network with three or more stages. A spine and leaf network is functionally similar to a three-stage Clos network, and therefore, spine and leaf networks are sometimes referred to as folded three-stage Clos networks. In general, Clos networks include three or more stages: an ingress stage, one or more mid-stages, and an egress stage. Nodes of each stage are connected to each node of each neighboring stage. For example, each node of the ingress stage is connected to each node of the first mid-stage, and each node of the last mid-stage (which is also the first mid-stage in a three-stage Clos network) is connected to each node of the egress stage. An example Clos network is shown in FIG. 2, as discussed in greater detail below.

In another example, interconnected topology 118 is implemented as a Virtual Chassis Fabric (VCF), e.g., as explained in Yafan An, "Tiers in Virtual Chassis Fabric," 30 Oct. 2013 available at http://forums.juniper.net/t5/Data-Center-Technologists/Tiers-in-Virtual-Chassis-Fabric/ba-p/214765. A VCF allows interconnected topology 118 to be managed as a single device, e.g., by virtual network controller 112. One example VCF implementation may be realized using four QFX5100-24Q switches from Juniper Networks, Inc., Sunnyvale, Calif. as spine switches and sixteen QFX5100-485 switches from Juniper Networks, Inc., Sunnyvale, Calif. as leaf switches. In this example, the spine switches support 48×10 Gigabit Ethernet (GbE) and 6×40 GbE interfaces, while each leaf switch uses 4×40 GbE interfaces as uplinks to the spine switches. This creates an oversubscription of 480:160 or 3:1 per leaf switch, in this particular example. Each leaf switch supports 48×10 GbE interfaces, such that the total port count is 768×10 GbE with 3:1 oversubscription.

In another example, interconnected topology 118 is implemented as an Internet protocol (IP) Fabric. An IP Fabric is made up of routing devices implementing a Border Gateway Protocol (BGP), and each of the routing devices is a BGP neighbor to each of the other devices in the IP Fabric. An example IP Fabric can be formed from four Juniper Networks QFX5100-24Q switches as spine switches and QFX5100-96S switches, available from Juniper Networks, Inc., Sunnyvale, Calif., as leaf switches. Such an arrangement results in an IP Fabric of 3072×10 GbE usable ports. As an example, the leaf switches are constructed using the QFX5100-96S, and 8×40 GbE interfaces are used as uplinks into the spine, in this example. Because each leaf switch in this example has eight uplinks into the spine, the maximum width of the overall spine is eight in this example. Each 40 GbE interface per leaf switch connects to a separate spine switch—thus, each leaf switch consumes one 40 GbE interface per spine switch. To calculate the maximum size of the IP Fabric, the number of server interfaces is multiplied by the number of leaf switches supported by the spine.

In yet another example, rather than interconnected topology 118 of FIG. 1, servers 108 may be connected by an interconnected topology according to IEEE 802.1BR. In accordance with IEE 802.1BR, interconnected topology 118 may instead include two spine switches, multiple leaf switches, and two or more satellite switches, such that there are two or more paths from any satellite switch to any other satellite switch. For example, in accordance with IEEE 802.1BR, there may be two controlling bridges in the position of chassis switches 104 and a plurality of port extenders in the position of TOR switches 106, interconnected as shown in interconnected topology 118.

As further described herein, virtual network controller 112 enables users (e.g., administrators) to generate routing policies for deployment to physical devices 104, 106 of interconnected topology 118 that operates to provide packet forwarding switch fabric of data center 102. For example, the techniques may be used to generate routing policies for deployment from virtual network controller 112 to the virtual routing and forwarding tables (e.g., VRFs) that provide traffic isolation for the different virtual networks over the switch fabric. Each of the VRFs may, as described herein, be viewed as a logical router providing packet switching/routing operations on a given switch 104, 106 for a different virtual network. As such, each VRF is typically isolated from the other VRFs such that no customer-specific routing or switching information is shared between the VRFs. According to techniques of this disclosure, virtual network controller 112 provides a user interface that presents administrator 110 one or more options by which to define logical "interconnects" between the various logical routers (LRs) operating on switches 104, 106 of the data center switch fabric (i.e., interconnected topology 118). Further, for any intra-fabric LR interconnects specified in the administrator's user input, virtual network controller automatically generates routing policies and deploys the policies to the LRs operating on the physical devices within the switch fabric to cause the LRs to selectively "leak" routes amongst their respective virtual networks, i.e., share specific routing information even though the VRFs may not be peer logical routers within the same routing domain and are otherwise operate in different virtual networks that are logically isolated from each other in terms of routing and network domains. In this way, the virtual network controller may automatically generated configuration information and policies that, when deployed to the physical devices of the switch fabric (i.e., the underlay devices), establish communication interconnects between specific VRFs and precisely control that leaking (sharing) of specific routes between the otherwise isolated VRFs. As such, the techniques provide fine-grain control over the leaking of routes in a unidirectional way from a single source LR to one or more destination LR(s) based on the administer-provided user input.

In general, the techniques enable the auto-generation "routing policies" by virtual network controller 112 for deployment to underlay devices (e.g., host physical devices on which logical routers execute). The policies define rules for causing the underlay physical devices to effectuate the logical interconnects between the logical routers of the overlay network. When applied by the physical devices, the policies enable the physical devices to implement the defined logical interconnects between the logical routers and to precisely control leaking of routing information between the logical routers. The policies may be applied, for example, by a host operating system or hypervisor executing on the physical device and which provide an operating environment for the logical routers executing thereon.

In some examples, routing leaking is implemented by the physical devices in unidirectional way from a source logical router to one or more destination logical routers. In various examples described herein, virtual network controller 112 may enable the user to generate physical device policies in a variety of ways for controlling route leaking, such as by selecting particular routing policies the user has set up for the virtual networks or by selecting the virtual networks themselves and creating policies for the relevant physical devices based on the selections.

In one example, virtual network controller 112 generates and deploys policies specifying routing groups (e.g., RIB groups) to control leaking of routes from a source LR to multiple destination LRs where the source LR and the destination LRs are deployed on the same physical device within the switch fabric. By grouping one or more routing tables to form a routing table group, a routing protocol executed by one of switches 104, 106 can import routes into all the routing tables in the group (e.g., multiple VRFs on the switch) and can export routes from a single routing table. Further information for RIB groups can be found in "[Junos] What is the use of RIB groups and how are they used?," https://kb.juniper.net/InfoCenter/index?page=content&id=kb16133&actp=METADATA, Juniper Networks, April 2020, and "rib-groups," https://www.juniper.net/documentation/en_US/junos/topics/reference/configuration-statement/rib-groups-edit-routing-options.html, Juniper Networks, April 2020, each of which is incorporated herein by reference.

In addition, virtual network controller 112 automatically generates and deploys protocol-specific policies (e.g., Border Gateway Protocol export and import policies) to control leaking of routes between from a source LR to one or more destination LRs where the source LR and the destination LR(s) are deployed on the different physical devices 104, 106 within the switch fabric of data center 102.

For example, if three tenants (e.g., three departments of a large corporation) are configured to communicate internally via respective, isolated VLANs (and respective sets of logical routers) but wish for some inter-tenant communication to flow between VLANs, an administrator for the tenants may interact with controller 112 to specific one or more "logical interconnects" as communication mechanisms for exporting & importing routes between one or more of the VLANs, causing the network controller to automatically generate and deploy policies to the logical routers to cause the logical routers to set up one-way communications between respective pairs of VNs and to selectively perform "route leaks" between the logical routers using the communication mechanisms. For instance, virtual network controller 112 may enable unidirectional communication from servers 108A to servers 108B, from servers 108B to servers 108C, and so on, and the routing tables for corresponding logical routers within switch fabric 118 may be required to route traffic between servers associated with different VLANs, thus necessitating the leaking of routing information between the logical routers through the defined interconnects. According to techniques of this disclosure, virtual network controller 112 may use previously established one-way routes (set up via route-leaking techniques described above) to build further configurations.

For example, if one-way communication policies are set up from servers 108A to servers 108B and from servers 108B to 108C already exist, virtual network controller 112 may implement the techniques of this disclosure to create another routing policy that incorporate these rules in a nested way, drilled down to physical device level. In this way, virtual network controller 112 may implement the techniques of this disclosure to improve the scalability and usability of communications between the different tenants of data center 102.

Again, each LR enables two VNs to interconnect with unidirectional policy rules. In cases of two larger or relatively complex VNs communicating with another over a given LR, the unidirectional nature of the policy rules requires a second LR for communications between the same two VNs in the opposite direction. Virtual network controller 112 implements the techniques of this disclosure to upend the need to create three LRs with the same VNs (the third one with all sorts of inter-VN rules for a mixed domain) to enable communications with a third VN, instead enabling interconnections between two existing LRs to be interconnected with unidirectional communication policies being defined for the inter-LR interconnect.

FIG. 2 is a block diagram illustrating an example Clos network 130. Clos network 130, or a similar Clos network, generally represents one example layout for interconnected topology 118 of FIG. 1. In this example, clos network 130 includes three stages of switches: ingress switches 132A-132N (ingress switches 132), mid-stage switches 134A-134N (mid-stage switches 134), and egress switches 136A-136N (egress switches 136). Although the letter "N" is used to designate a variable number for each of ingress switches 132, mid-stage switches 134, and egress switches 136, it should be understood that the number of switches included in each stage is not necessarily the same. That is, there may be different numbers of ingress switches 132, mid-stage switches 134, and egress switches 136. Furthermore, although Clos network 130 includes three stages, it should be understood that a general Clos network may include any number of stages.

As further described herein, the techniques may be used to generate routing policies for deployment to physical devices of Clos network 130 that operate to provide packet forwarding via over the switch fabric of an interconnected topology of a data center. For example, the techniques may be used to generate routing policies for logical routing operations associated with virtual routing and forwarding tables (e.g., VRFs) utilized by the physical packet forwarding devices 132, 134 for providing traffic isolation using different virtual networks over the switch fabric, where the policies control selective route leaking between the virtual networks for logical routers operating on the same physical device or even on different physical devices of Clos network 130. To illustrate, in the example of FIG. 2, controller 112, in response to administrator 110 specifying input to create a "logical interconnect" between logical routers associated with virtual network 133A and 133B, may auto generate router policies to control route leaking between VRF 135A of VLAN 133A and VRF 135B of VLAN 133B, thereby allowing inter-tenant traffic to flow between the VLANs in strict accordance with the routing policies.

Further, in some examples, the techniques described herein may be used to automatically generate and deploy policies to integrated routing and bridging (IRB) interfaces of VRFs 135A, 135B to control inter-tenant traffic flow through PNF(s) 137 in the forwarding path of the data center as traffic flows between two or more tenants. For example, traffic flowing into one of VRFs 135A, 135B for virtual networks 133A, 133B may be shunted from the VRF to PNF 137 for application of network services prior to flowing into the other virtual network and returning to switch 134A.

These techniques may simplify the architecture of devices and the network of the data center, as it may extend constructs and configurations already widely used in data center IP-Clos networks using, e.g., Ethernet VPN Virtual Extensible LAN (EVPN VxLAN), to apply for inter-tenant service chaining through any generic PNF. This architecture also allows a software defined network (SDN) controller to automate the configuration of inter-tenant service chaining, without requiring any manual intervention, e.g., manual entry of commands via command line interface (CLI).

Figure 3:
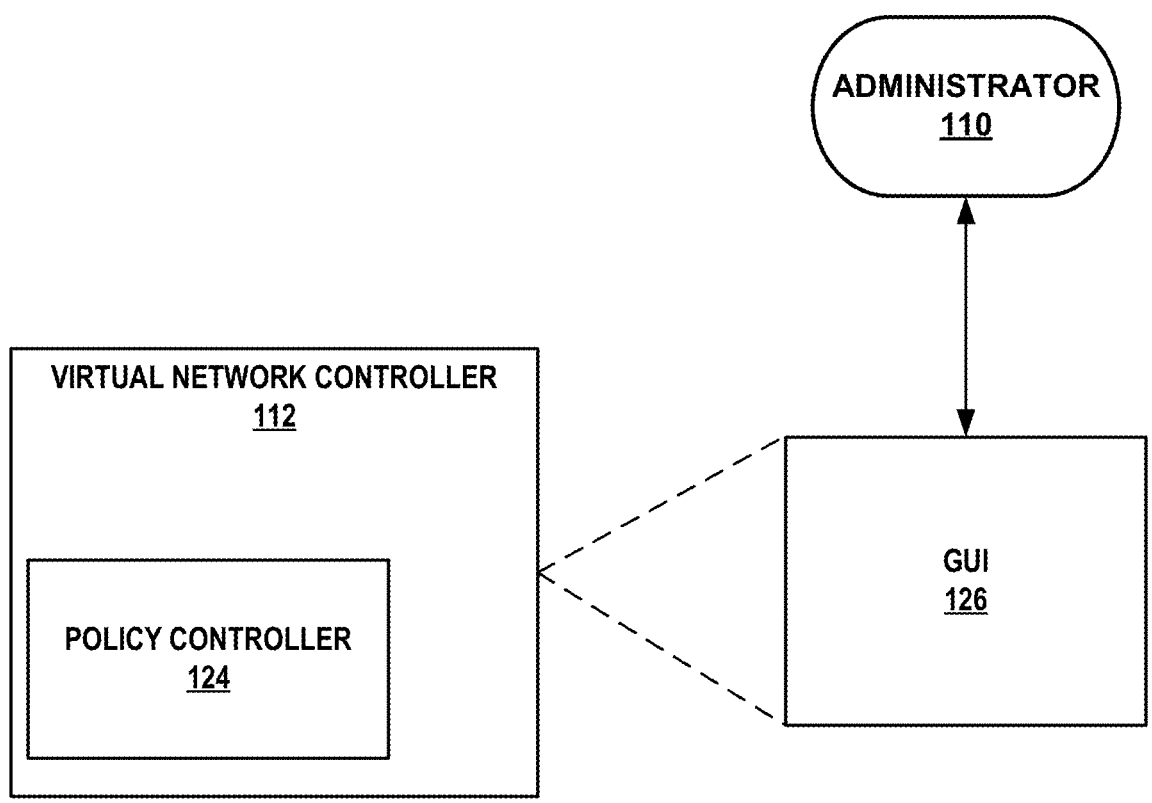
FIG. 3 is a block diagram illustrating additional details of the virtual network controller of FIG. 1.

FIG. 3 is a block diagram illustrating additional details of virtual network controller 112 of FIG. 1. As shown in FIG. 3, virtual network controller 112 includes policy controller 124. In various examples, policy controller 124 distributes policy rules including tags for objects at a project level. Policy controller 124 may additionally or alternatively distribute policy rules including tags specifying various different object levels, such as a global environment level, a project level, a virtual network level, a virtual machine level, or an interface level. Policy controller 124 may use various configuration objects to implement the one or more policies.

As one example, policy controller 124 may apply one set of configuration objects at a global level, with this set of configuration objects including global application policy sets, global firewall policies, global firewall rules, and global tags across a plurality of levels and/or categories. Policy controller 124 may distribute the first set of configuration objects at the global level to the virtual routers. Policy controller 124 matches global tags associated with global application policy sets, global firewall policies, and global firewall rules to objects tagged with the global tags. Based on the global application policy sets, global firewall policies, and global firewall rules, policy controller 124 allows or blocks network traffic between interfaces of the objects tagged with the global tags. The interfaces may be virtual machine interfaces (VMIs), for instance, or switch interfaces of the physical devices of interconnected topology 118.

Policy controller 124 may apply a different set of configuration objects at a project level, with this set of policy rules including project-specific application policy sets, firewall policies, firewall rules, and tags across a plurality of levels. Policy controller 124 may distribute this set of configuration objects at the project level, by matching project tags associated with project-specific application policy sets, firewall policies, and firewall rules to objects tagged with the project tags. Based on the project-specific application policy sets, firewall policies, and firewall rules, policy controller 124 allows or blocks network traffic between interfaces of the objects tagged with the project tags.

In further examples, policy controller 124 may specify lower-level configuration objects, such as application policy sets, firewall policies, firewall rules, and tags defined at a virtual network-specific level, a virtual machine-specific level, and/or an interface-specific level. By doing so, policy controller 124 may apply a hierarchical set of policies to various objects within data center 102. Thus, the techniques of the disclosure allow for distribution of simplified traffic policies that are scalable and robust across many different types of deployments and execution environments. Additional description is found in U.S. patent application Ser. No. 15/819,522, filed Nov. 22, 2017 and entitled "Scalable Policy Management for Virtual Networks," which is incorporated herein by reference in its entirety.

Virtual network controller 112 also operates an interactive user interface in the form of graphical user interface (GUI) 126. Virtual network controller 112 may display data, such as configuration options, to administrator 110 via GUI 126, and may receive user input, such as configuration option selections or other specific inputs (in the form of IP addresses, etc.) from administrator via GUI 126. The content of GUI 126 may change at various stages, such as in response to the last user input received from administrator 110. Screenshots of various embodiments of GUI 126 are described below with respect to other drawings of the accompanying figures.

Figure 4:
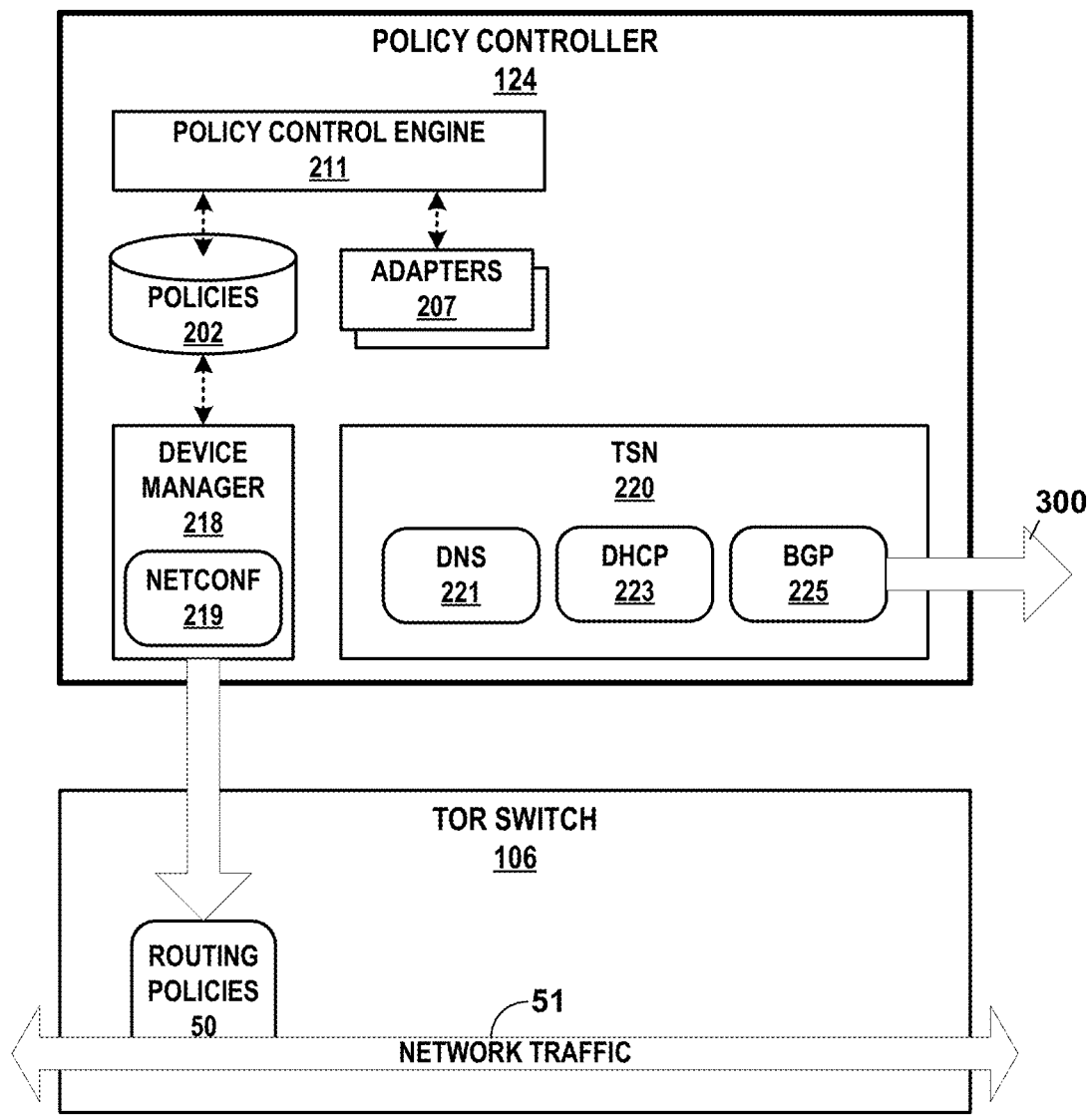
FIG. 4 is a is a block diagram illustrating a policy controller and a supporting TOR switch of FIG. 2 in more detail.

FIG. 4 is a is a block diagram illustrating the policy controller and the supporting TOR switch of FIG. 2 in more detail. Policy controller 124 shown in FIG. 4 may represent one example of policy controller 23 shown in the examples of FIG. 2. As shown in the example of FIG. 4, policy controller 124 may represent a collection of tools, systems, devices, engines, and modules that perform operations in accordance with one or more aspects of the present disclosure. Policy controller 124 of FIG. 4 may be implemented in a manner consistent with the description of policy controller 23 provided in connection with FIG. 1. In FIG. 4, policy controller 124 includes policies 202, as illustrated in FIG. 1.

Policies 202 may also be implemented in a manner consistent with the description of policies provided in connection with FIGS. 1-4. In some examples, as illustrated in FIG. 2, policies 202 may be implemented as a data store. In such an example, policies 202 may represent any suitable data structure or storage medium for storing policies 202 and/or information relating to policies 202. Policies 202 may be primarily maintained by policy control engine 211, and policies 202 may, in some examples, be implemented through a NoSQL database. Policy control engine 211 may also control adapters 207. In one example, policy control engine 211 invokes one or more adapters 207 to discover platform-specific resources and interact with platform-specific resources and/or other cloud computing platforms.

For instance, one or more adapters 207 may include an OpenStack adapter configured to communicate with an OpenStack cloud operating system operating on servers 126. One or more adapters 207 may include a Kubernetes adapter configured to communicate with a Kubernetes platform on servers 126. Adapters 207 may further include an Amazon Web Services adapter, Microsoft Azure adapter, and/or a Google Compute Engine adapter. Such adapters may enable policy controller 124 to learn and map the infrastructure utilized by servers 12 and chassis switches 104. Policy controller 124 may use multiple adapters 207 at the same time.

Policy control engine 211 may, as one example, instantiate one or more objects representative of the infrastructure, such as chassis switches 104, TOR switches 106, or servers 108. Policy control engine 211 may, as noted above, instantiate one or more object for supporting TOR switches 106 and chassis switches 104 within policy management database 202 (which may be another way to refer to policies 202). Policy control engine 211 may associate the policies 202 to be enforced by various portions of the infrastructure to the various objects of the policy management database. Device manager 218 may represent a unit configured to manage network devices discovered by policy control engine 211 through inspection via adapters 207.

Responsive to determining that one or more policies 202 are associated with an object representative of either TOR switch 106 and/or adjacent chassis switches 104, device manager 218 may convert the policies 202 to configuration data (shown as "routing policies 50" in the example of FIG. 4) supported by TOR switch 106 in the manner discussed in more detail above. To illustrate, consider that some TOR switches 106 may support address groups while others TOR switches 16 may not. Further, an interface of chassis switches 104 may be associated with one or more tags, or may inherit tags from a project/virtual node (VN) to BMS represented VMI interface.

Device manager 218 may select an application tag from the one or more tags (which may be a list) associated with the interface of chassis switches 104, a corresponding application policy set (APS) at a global and possibly project configuration level, and potentially a global default APS level. Device manager 218 may select, in the following order, the global default APS first, followed by the global application tag APS, followed by with the project default APS associated with the BMS interface, and then the project application tag APS associated with the BMS interface. As an example, consider an example Action (Pass) policy rule with a Service-group (e.g., a list of port and protocol) for an Endpoint 1 (routing engine expression of tags) in a direction (receiving→or sending←, or both <- ->) to Endpoint 2 (identified using a regular expression of tags) having a Match condition.

TOR switch 106 may include a service-group construct or not. When TOR switch 106 includes the Service-group construct, device manager 218 may translate the Service-group of the above policy as it is. When TOR switch 106 does not include the Service-group construct, device manager 218 may translate the convert the above policy to a flat list and repeat all of the other tuples as same. Device manager 218 may next identify when the regular expression for Endpoint 1 and Endpoint 2 supports "=" and "&." For example, assume Endpoint 1 is "Tier=Web & Site=USA & Deployment=Production." Device manager 218 may create an address group called "Tier_Web_Site_USA_Deployment_Production" and add all of the ports which have the above tags to this address group.

Device manager 218 may perform the same operations with respect to the regular expression for Endpoint 2. When the address_group expression is not present, device manager 218 may use each IP prefix and repeat other entries in the tuple. When processing the Match condition, device manager 218 may expand and define them as part of Endpoint 1 and Endpoint 2. For example, assume that the above policy is matching on Application. Assuming device manager 218 received "Application=HRAPP" and "Application=FinanceApp tags," device manager 218 may add these conditions to Endpoint 1 and Endpoint 2 as multiple rules. Device manager 218 may define the foregoing as flat rules, which represent configuration data supported by TOR switch 106, and program the flat rules within TOR switch 106 as ingress and egress rules based on the direction set forth in the above policy.

Device manager 218 may then interface with TOR switch 106 to configure, based on routing policies 50, the policy within TOR switch 106 using NETCONF 219. More information regarding NETCONF can be found in RFC 6241, entitled "Network Configuration Protocol (NETCONF)," dated June 2011, the entire contents of which are hereby incorporated herein as if set forth in its entirety. Although described as interfacing with TOR switch 106 using NETCONF 219, device manager 218 may utilize any device management protocol by which to interface with TOR switch 106, such as Junos PyEz. In any event, device manager 218 may install the routing policies 50 within TOR switch 106 to thereby allow TOR switch 106 to enforce the policy represented by routing policies 50.

Device manager 218 may associate the each of routing policies 50 with a corresponding one of the logical routers (e.g., VRF) instances on a particular one of switches 104, 106. In other words, device manager 218 may identify a port of TOR switch 106 to which chassis switches 104 is coupled. Device manager 218 may obtain the port of TOR switch 106 through inspection of policies 202, where the object representative of TOR switch 106 may identify the port(s) by which chassis switches 104 couple to TOR switch 106. Device manager 218 may, when obtaining policy 202, also determine to which port(s) of chassis switches 104 couples to TOR switch 106.

Policy 202 may include tag identifiers, which device manager 28 may obtain so as to identify the associations between policies 202 and various workloads. In this way, device manager 28 may identify workloads executed by chassis switches 104 to which policies 202 are associated. Device manager 28 may then convert policy 202 into configuration data supported by TOR switch 106 to enforce at least a portion of policy 202 with respect to network traffic 51 passing between the TOR switch 106 and the associated workloads executed by chassis switches 104 via the identified port. Device manager 218 may also interface with TOR switch 106 to update routing policies 50.

That is, responsive to determining that one or more policies 202 associated with the object representative of TOR switch 106 and/or chassis switches 104 has changed, device manager 218 may convert the updated one or more of policies 202 into new routing policies 50, and configure, via NETCONF 219, TOR switch 106 to apply new routing policies 50 to network traffic 51 passing between TOR switch 106 and chassis switches 104 via the identified port. TOR switch 106 may then apply routing policies 50 to network traffic 51 destined for and/or received from chassis switches 104. Applications of routing policies 50 may result in TOR switch 106 dropping and/or forwarding one or more flows represented by network traffic 51.

Although not shown in the example of FIG. 4, device manager 218 may obtain information indicative of which flows are dropped and/or forwarded, and generate one or more alerts, errors, warning and/or reports indicative of the dropped and/or forwarded flows, which may be used in troubleshooting execution of different workloads on chassis switches 104, TOR switches 106 itself, etc. As further shown in the example of FIG. 4, policy controller 124 also includes TSN 220. TSN 220 may represent a unit configured to interface with TOR switches 16 in order to provide backend services, such as domain name system (DNS) services 221 ("DNS 221"), and dynamic host configuration protocol (DHCP) services ("DHCP 223").

More information regarding DNS can be found in RFC 1034, entitled "Domain Names—Concepts and Facilities," dated November 1987, and RFC 1035, entitled "Domain Names—Implementation and Specification," dated November 1987, the entire contents of both of which are hereby incorporated by reference as if set forth in their respective entireties. More information regarding DHCP can be found in RFC 2131, entitled "Dynamic Host Configuration Protocol," dated March 1997, the entire content of which is hereby incorporated by reference as if set forth in its entirety. TSN 220 may also include a BGP service 225 ("BGP 225") that obtains routing advertisements 300 in the manner described above.

TSN 220 may determine when to send the routing advertisements 300 advertising the EVPN route, as one example, responsive to receiving a request for a network address via DHCP 223. That is, chassis switches 104 may, as a way of gaining access to the network, issue a DHCP discover message requesting that TSN 220 and any other DHCP server that receives the DHCP discover message provide an offer for an IP address. TSN 220 may responsive to this DHCP discover message provide a DHCP offer message identifying an IP address for use by chassis switches 104, and various parameters associated with use of the IP address (duration, type—static or dynamic, etc.). chassis switches 104 may then respond with a DHCP request message requesting the IP address in the DHCP offer message be reserved for use by chassis switches 104.

In any event, the request for the IP address signals to TSN 220 that chassis switches 104 are attempting to access the network (which may be performed shortly after chassis switches 104 are booted up or otherwise powered on). Responsive to the request for the IP address, TSN 220 may invoke BGP service 225 to obtain routing advertisement 300. Routing advertisement 300 may include the tags, addressed as one or more BGP extended communities. The route may include an EVPN route to chassis switches 104, and routing advertisement 300 may include, in addition to the tag, a next hop field identifying TOR switch 106 as the next hop. Routing advertisement 300 may also include one or more of a label associated with a VLAN, a label associated with a VXLAN, and a security group to which the route corresponds.

TSN 220 may, after obtaining routing advertisement 300 via BGP server 225, output or otherwise transmit (such as broadcast) routing advertisement 300 to the network. TSN 220 may transmit the routing advertisement so as to enable chassis switches 104 to communicate with any other overlay workloads supported by virtual routers of servers 108. Each of the virtual routers may process routing advertisement 300 to extract the tags. The virtual routers may process the tags during policy evaluation. Each of the policies may include a tag identifier (ID).

The virtual routers may process the tags and identify, based on the tag IDs, which policy is to be enforced with respect to traffic received or sent via the associated route. More information regarding policy evaluation is described in U.S. application Ser. No. 15/476,136, entitled "SESSION-BASED TRAFFIC STATISTICS LOGGING FOR VIRTUAL ROUTERS," field Mar. 31, 2017, the entire contents of which are hereby incorporated by reference as if set forth in its entirety; and above noted U.S. patent application Ser. No. 15/819,522, entitled "SCALABLE POLICY MANAGEMENT FOR VIRTUAL NETWORKS," filed Nov. 21, 2017.

VN agents executing the tenant VNs may then enforce the various policies associated with the tags to prohibit or authorize transmission of traffic via the route to associated chassis switches 104. TOR switch 106 may receive routing advertisement 300 and attempt to process routing advertisement 300. However, because the next hop in routing advertisement 300 identifies TOR switch 106, TOR switch 106 may drop routing advertisement 300 before updating routing information stored by TOR switch 106, thereby preventing any circular forwarding of network traffic.

Using input received via GUI 126, policy control engine generates policies 202 that enable allow communications between different tenants' VNs, using the physical devices of interconnected topology 118 as intermediate devices. Each tenant has its own VN (e.g., a subnet) executed using servers 108. To enable communication between the VNs, device manager 218 causes the VNs to perform route leaking. For instance, via route leaking, device manager 218 may push one of policies 202 that allow a particular VN subnet to communicate in a unidirectional way with a particular port, etc. Device manager 218 may set up on unidirectional communication from a first tenant VN to a second tenant VN using LRs.

Policy controller 124 may enable administrator 110 to create an extra level of rules that allow a single LRs to also communicate unidirectionally with one or more other LRs (e.g., to enable one floor of data center 102 to send egress communications to one or more other floors, etc.). Policy control engine 211 may update policies 202 to include firewall policies in terms of which communications are permitted, scrutiny of the direction, application constraints, etc. Policy control engine 211 may also update policies 202 to specify how the inter-LR communications are conducted, and/or what types of data are communicated. Device manager 218 pushes policies 202 to the physical devices (TOR switches 106 and chassis switches 104) of the switch fabric of interconnected topology 118.

As such, policy controller 124 implements the techniques of this disclosure to add routing policies for physical devices. An example of a policy is to accept communications from a particular IP address, if communications include a particular prespecified value. While these rules of policies 202 only apply to the physical devices of interconnected topology 118, device manager 218 pushes these policies to the overlay, for the policies to then be pushed to the underlay network. Once pushed via the overlay network to the underlay network in this way, policy controller 124 uses the routing policies to effectuate one or more LR interconnects within the same switch fabric (of interconnected topology 118 in this example). As such, the LR interconnects of this disclosure are applied to the interconnections between the physical devices (TOR switches 106 and/or chassis switches 104) of the switch fabric of interconnected topology 118.

In an example in which the switch fabric of interconnected topology includes 200 switches and 10 VNs preexist for various tenants, 10 IP subnets (IP addresses) preexist for the tenants. In this example, multiple LRs may also exist to enable unidirectional communications from one VN to one or more of the remaining nine VNs. As such, multiple LRs can communicate via each LR. Depending on the hops of the communication path, each LR is pushed to a discrete number of the physical devices of the switch fabric. Upon receiving packetized data traffic, the physical devices use the pre-pushed LR configurations to scrutinize the traffic, and determine how to process the traffic.

Device manager 218 implements the techniques of this disclosure to set up LR-to-LR communications among previously created LRs. For instance, policy control engine 211 may use the input received via GUI 126 to formulate policies 202 such that some of policies 202 reflect routing policy rules for intra-fabric LR-to-LR communications. In this way, administrator 110 may use virtual controller 112 (in some examples, an SDN controller) to configure policies 202 to govern intra-fabric LR-to-LR interconnects. By setting up multiple LR interconnects within the same switch fabric using the specific rules provided in policies 202, virtual network controller 112 may generate a greater number of VN-to-VN connections in a nested way, thereby setting up a greater number of VN-to-VN connections more efficiently and easily.

Virtual network controller 112 may operate GUI 126 to enable administrator 110 to create routing policies of type "physical device" or type "vRouter." For the physical device type routing policy, administrator 110 may configure "from" and "then" policy statement options supported by various QFX family routers described above. Additionally, virtual network controller 112 may enable administrator 110 to configure several routing policy attributes that can be pushed to the physical devices (e.g., TOR switches 106 and/or chassis switches 104) of the switch fabric of interconnected topology 118.

According to aspects of this disclosure, virtual network controller 112 configures GUI 126 to include an option by which to set up LR interconnects within the switch fabric of interconnected topology 118. Once set up, an intra-fabric LR interconnect leaks the routes for unidirectional communications from a single source LR to one or more destination LR(s) using routing policies provided by administrator 110 or a list of tenant VN subnets selected by administrator 110. For example, LR1-to-LR2 represents one interconnect, while LR2-to-LR1 is another interconnect. The unidirectional setup of these LR interconnects improves the maintenance aspects of the interconnects, making them easier to maintain.

To leak the routes, administrator 110 may select one LR as a source, and may select one or more LRs as destination(s). Administrator 110 may select either the list of routing policies or the list of tenant VNs existing in the source LR to form policies 202. For example, administrator 110 may select a routing policy that is already created, or may select VN(s) that already exist in a single source LR. In the latter case, policy controller 124 creates the routing policy internally from the VN subnets, thereby alleviating user interaction caused by otherwise requiring administrator 110 to create the routing policy.

With respect to route leaking, each VN has an identity for isolation purposes, and administrator 110 may select VLAN (L2) or VXLAN (L2/L3). All elements within a VLAN can communicate with each other. To specify which IP or subnet can communicate, policy controller 124 sets up routing policies of policies 202 by specifying the from and then clauses. Policy controller 124 may update the routing tables (routing information bases or "RIBs") to reflect the rules. Each LR has its own RIB, and so policy controller 124 may list specific IP addresss on an LR. The LRs are created in the network as constructs (along with VNs, and the interconnects). Device manager 128 may configure the physical devices by pushing the policy information received via GUI 126 to create a routing instance for a source LR, and to specify particular IP addresses for each LR.

In this way, virtual network controller 112 automates several policy translation and push operations needed to configure the physical devices (e.g., constructs such as the LR source which is a routing instance, or the protocol set of interface routes protocol, static protocol, BGP protocol, etc.). As such, virtual network controller 112 automatically creates policies to enable communications on these protocols, and automates construct creation for these communications as well. By pushing these rule configurations to the physical devices in this way, virtual network controller 112 implements the techniques of this disclosure to error-proneness of the physical device configuration operations, as well. Routing policy creation is performed in a clean way by an abstraction layer implemented by device manager 218. While routing instance creation is handled during LR set up, device manager 218 installs policies on the physical devices of the switch fabric of interconnected topology 118.

As part of each LR-to-LR interconnect that virtual network controller 112 creates in accordance with this disclosure, virtual network controller 112 also creates a RIB group configuration. Administrator 110 may select existing LRs, and device manager 218 may stitch the included routing instances using the intra-fabric LR interconnect creation of this disclosure. The VNI, VXLAN information, VNs with which communications are allowed, and other policy attributes are pushed to the physical devices by way of the RIB groups.

If interconnected LRs reside on different physical devices, the physical devices do not have access to one another's routing instances (e.g., via the LRs on the other physical devices). Via the policy push-based physical device configuration of this disclosure, the physical devices share the routing instances. For instance, the source device may perform a VRF export, and each destination device may perform a VRF import. Each LR corresponds to a different VRF, and thus, administrator 110 may remain agnostic to which LRs reside on which physical devices. Device manager 218 automates and push the configurations to the physical devices based on LR discovery, and whether the LRs of the interconnect reside on the same device or on different devices is immaterial.

FIG. 5 is an screenshot illustrating a UI-based functionality presented by virtual network controller 112 for auto-generating routing policy configuration for defining logical interconnect and controlling routing leaking between isolated logical routers of different virtual networks according to the techniques described herein. The screen shot of FIG. 5 includes various attributes and their values which administrator 110 can input via GUI 126 of virtual network controller 112. In this example, if administrator 110 selects the physical router option, then administrator 110 can specify various criteria for matching against routing information received from other routers (e.g., a "FROM" clause specifying a matching criteria such as a routing protocol for the routing information, family, etc.). In a subset of use-case scenarios, the auto-generated routing policies may vary on a protocol-to-protocol basis. In addition, the administrator may define one or more actions to be taken by the receiving router (referred to as a 'THEN' clause) upon matching the criteria specified by the policy against routing information received via a logical interconnect. Example FROM clauses and THEN clauses corresponding to the selections are illustrated in FIG. 5. Routing policy terms are extended to allow the illustrated set of attributes and their options to be automatically generated for configuring a physical device type routing policy, which directly co-relates with device policy-statement options applicable to the QFX family of routers described above. An example of a routing policy that device manager 218 may push to a physical device is shown below:

Example FROM Clause syntax:
   Protocol:
      <aggregate|bgp|direct|evpn|ospf|ospf3|pim|static>
   Family: <inet|inet-vpn|evpn>
   AS-path: <AS number(s) separated by spaces>
   External: <OSPF Type 1|OSPF Type 2>
   local-pref: <integer number>
   NLRI: <[List of multiple value from 1 to 10]>
   prefix list: <[list of Interface Route Table UUID]>
      <exact|longer|orlonger>
   Route Filter: <route filter IP address or hostname>
      <exact|longer|orlonger|prefix-length-range<'/<minimum-length>-/<maximum-length>'>|through<string>|upto<string>>

Example THEN Clause syntax:
   Action: <Accept|Next Reject>, External: <OSPF Type 1|OSPF Type 2>,
   As-path-expand: <AS number(s) separated by spaces>
   As-path-prepend: <AS number(s) separated by spaces>

Figure 6:
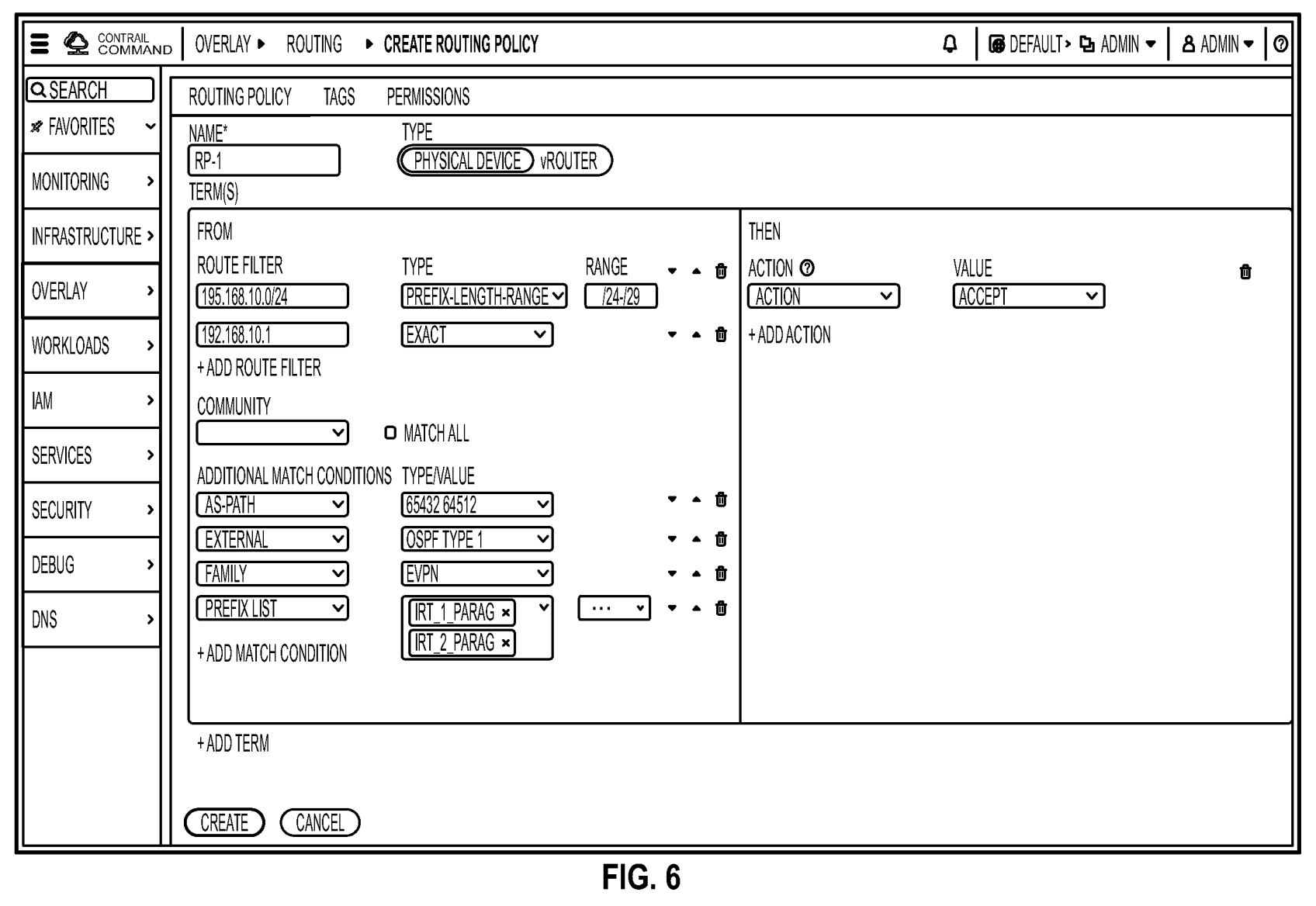

FIG. 6 is a screenshot illustrating an example a UI presented by a virtual network controller which enables administrator 110 to define physical device-type routing policy, including specifying FROM and THEN policy-statement options to be applied by the physical devices of the switch fabric to control route leaking. If the "physical device type" option is selected, GUI 126 may display all of the attributes that are applicable to physical devices. As part of the routing policy, administrator 110 may input information for create, delete, and all the supported functionalities. Virtual network controller receives the user input via GUI 126 and pushes the resulting routing policy rules to the switch fabric of interconnected topology 118.

To implement the LR interconnect within a single switch fabric, device manager 218 may automatically generate routing policies that configure the logical routers (LR) to leak route from single source LR to one or more destination LRs using the particular routing policy of policies 202, and in particular, the route filter options and community linked thereto. The route is leaked either by way of the routing policy user set up or by way of the VN that was selected. The community is a VRF with a unique number that does not overlap with any other community. Each community represents a domain which virtual network controller 112 forms for leaking the route. Given the number for the domain, and using the contents of this domain, device manager may accept route filters for pushing to the physical devices.

In some examples, device manager 218 of virtual network controller 112 generates the policies such that each leaked route is leaked in a unidirectional from a source LR to one or more destination LR(s). In other examples, device manager 218 may generate policies to direct the logical routers to define and utilize RIB groups as a logical interconnect for leaking routes when a source LR and destination LR both exist on the same physical device. Further, device manager 218 generate and deploy the routing policies to direct the LRs to use a VRF import function on the destination LR(s) upon receiving leaked routes if the source LR and destination LR exist on different physical devices. In these examples, device manager 218 may generate the routing policy to specify a community name and community member for the logical routers to use when leaking the routes using a RIB group. The community member is the route target value either user-configured on the source LR UI page, or is a value auto-generated by virtual network controller 112 if not provided via user input as a route-target value in the source LR UI page.

To generate an intra-fabric LR interconnect, virtual network controller 112 receives, via GUI 126, various information from administrator 110. For the source LR, administrator 110 may select the single source LR, and one of the list of VN(s) existing in the source LR, or a list of one or more routing policies.

For each of the destination LR(s), virtual network controller 112 may enable administrator 112 to select one or more physical router device(s). To implement the LR interconnect, if administrator 110 selects a list of VNs that exist in the source LR, virtual network controller 112 may internally create a routing policy with the route filter set to the subnets of the selected VN. Device manager 218 may use this routing policy to leak routes from the source LR to the destination LR(s).

If administrator 110 selects a list of routing policies (RP in the illustrated screenshot), virtual network controller 112 may use the specified RP by internally adding a corresponding community with the community member field set to the source LR's route target value. Virtual network controller 112 may add this community internally only for those RP terms which have a "route-filter" from clause defined with an "accept" condition. The intra-fabric LR interconnect techniques of this disclosure do not allow for the same source LR to be selected as a source in more than one LR interconnect.

Because of the LR interconnects being unidirectional, device manager 218 may use a regroup technique for intra-device LR route leaking. If the LRs are distributed across different devices, then device manager 218 may use the VRF import and export techniques of this disclosure to leak the routes. To set up the LR interconnect, virtual network controller 112 takes the source LR from administrator 110, and also how to leak the route, namely, either using a specified routing policy, or by selecting a pre-existing VN. Internally, the IP based route policy is generated. For the destination LR, virtual network controller 112 presents an additional option indicating the destination LR could be on any of multiple physical devices.

Administrator 110 may select the pertinent physical devices to which to push the configuration. If administrator 110 selects a list, virtual network controller 112 generates a routing policy internally. Because each VN has a list of subnets, policy control engine 211 may create the routing policy to enable certain IP addresses to leak the route in unidirectional ways. Again, the route leaking is done differently based on whether or not the LRs are hosted on the same physical device or disparate ones. As such, virtual network controller 112 may either step through the user-defined routing policy, or may pull the routing policy from the VN selected by administrator 110. If administrator 110 creates a routing policy, the community members are not available to administrator 110.

If administrator 110 selects a VN for set up, virtual network controller 112 autogenerates the configuration information shown below. If administrator 110 provides a routing policy, then virtual network controller 112 may populate (or "plug in") in the community information. The VRF export process provides the community, which is a directory or "route target." For instance, the VRF export may configure a physical device to allow certain communications under a particular community. All physical devices pertinent to the new policy receive the policy update generated by policy control engine 211. In a given device, the software process that receives the policy update is a "NetCom" protocol that pushes the corresponding settings.

FIG. 7A is a screenshot illustrating example configuration data defining routing policies that device manager 218 may generate and push to logical routers to define RIB groups for configuring route leaking between particular logical routers executing on the same physical device.

FIG. 7B is a screenshot illustrating example configuration data defining routing policies that device manager 218 may generate and push to logical routers for configuring a VRF import operation for route leaking between particular logical routers executing on different physical devices.

FIG. 8 is a screenshot illustrating a user interface presented by virtual network controller 112 that enables an administrator to define a LR interconnect between LRs within the same fabric for controlling route leaking between virtual networks according to aspects of this disclosure. The LR interconnect of FIG. 8 may be effectuated by way of regroup and/or other functions. GUI 126 displays the LR interconnect name to administrator 110 with create, delete, etc. as options. FIG. 8 also illustrates the single source LR interconnect with options to select between, routing policy-based or VN-based route leaking methods, with potentially multiple destination LRs.

Figure 9:
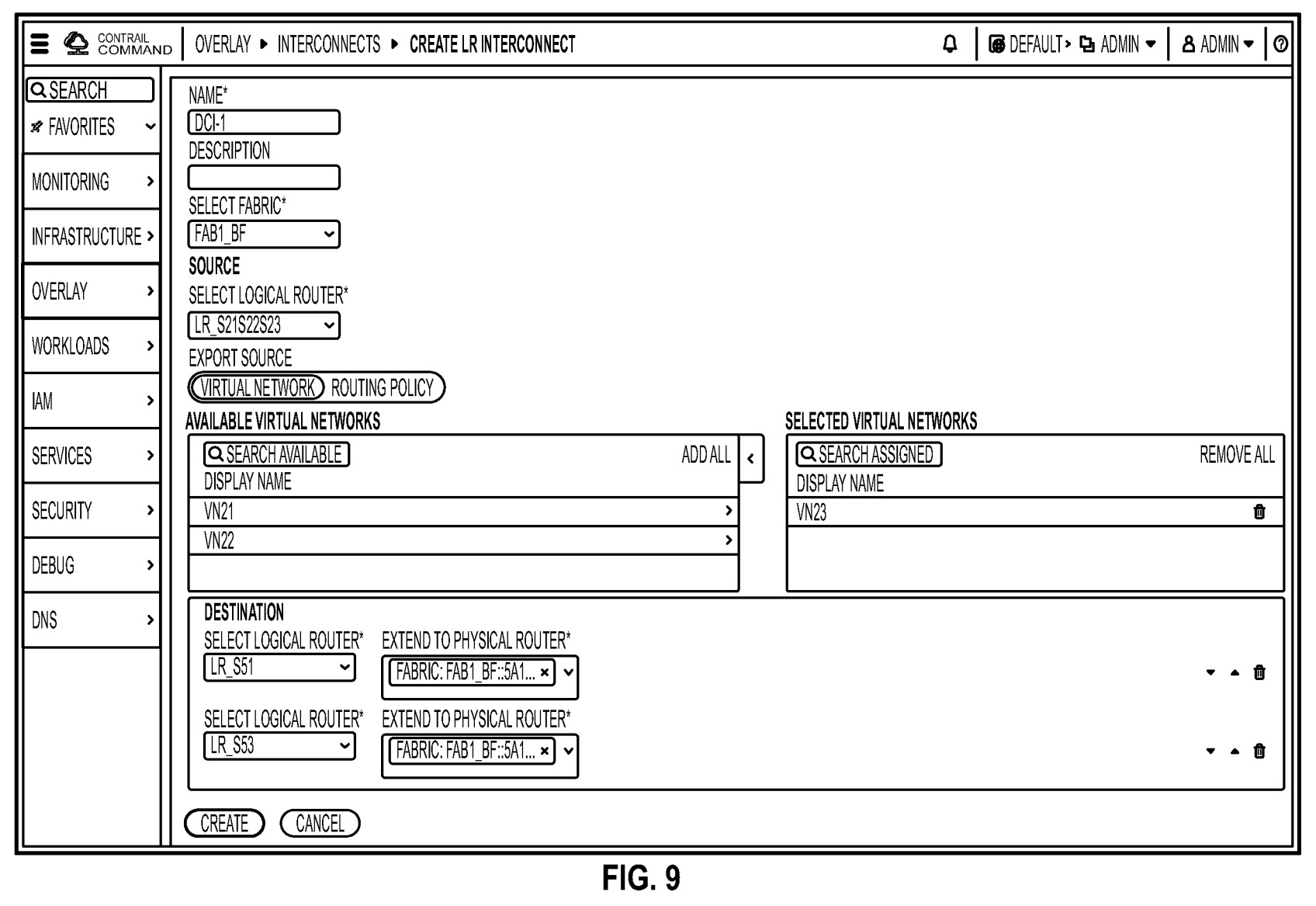

FIG. 9 is a screen shot illustrating a user interface presented by virtual network controller 112 that enables an administrator to easily configure an intra-fabric LR interconnect between LRs simply by selecting the virtual networks corresponding to the LRs. If administrator 110 selects LR interconnect create (i.e. in the selected single fabric), then virtual network controller 112 may update GUI 126 to show all LRs of the VN-based interconnect in a dropdown menu. Again, GUI 126 enables administrator 110 to select the single source LR, and to select the way in which the route leaking is done (i.e. the two options described above). The screenshot of FIG. 9 shows a use case scenario in which administrator 110 has selected the VN-based set up of the LR interconnect.

The screenshot of FIG. 9 also shows the available VN names for the LR interconnect setup. In the illustrated use case scenario, administrator 110 may select a particular VN for route leaking (e.g., VN20) causing the VN20 subnets to be leaked. In this case, virtual network controller 112 autogenerates the routing policy with the selected subnets and cause route leaking. Once the VNs are selected for the LR interconnect setup (e.g., the VNs that need to communicate), administrator 110 may create an LR. Device manager 218 then pushes the configuration is to the physical devices. According to the aspects of this disclosure, administrator 110 can select multiple LRs on the same fabric for the LR interconnect (with one source LR and one or more destination LRs).

Figure 10:
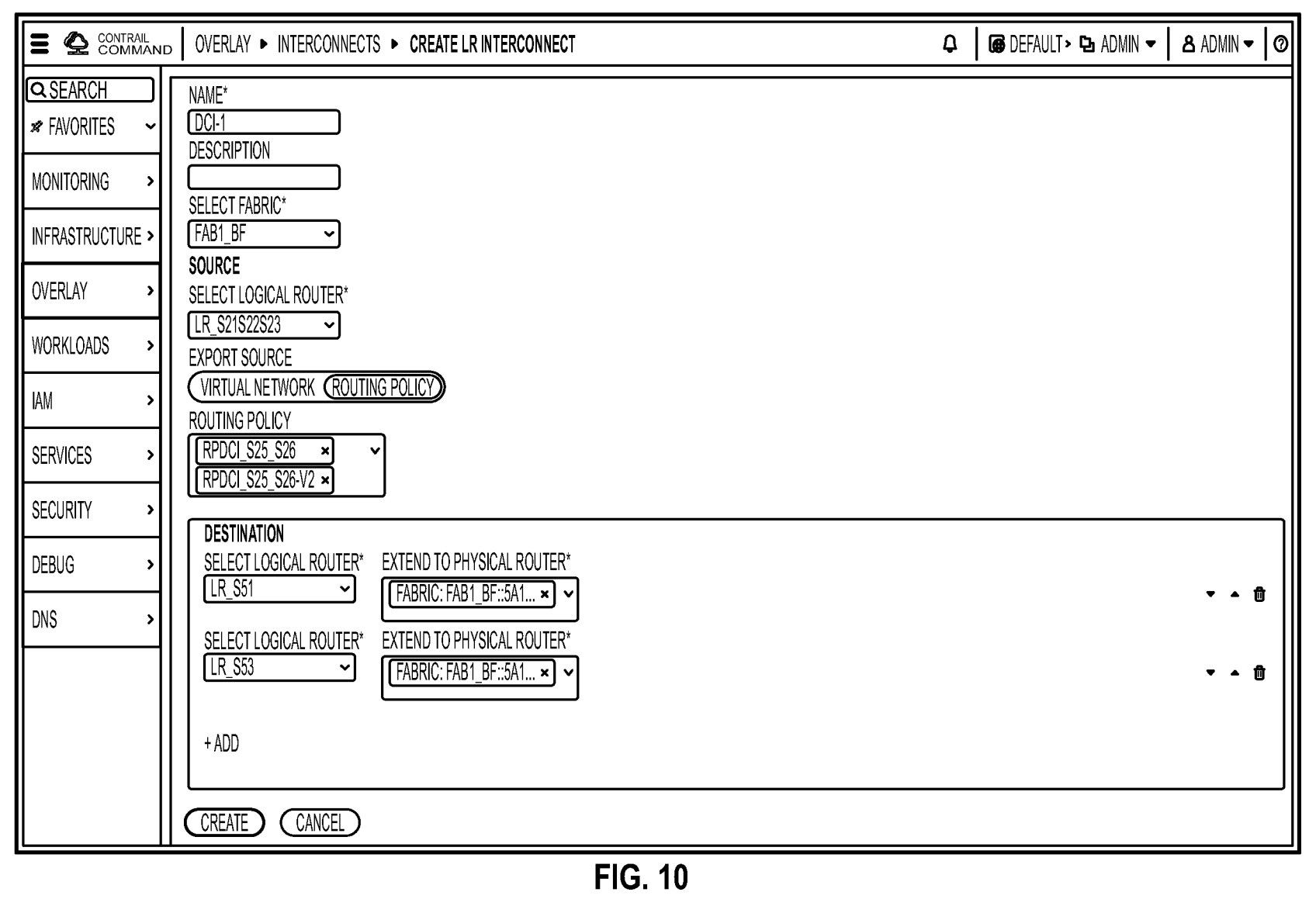

FIG. 10 is a screenshot illustrating an example user interface of virtual network controller 112 the enable a routing policy selection-based LR interconnect setup, according to aspects of this disclosure. FIG. 5, discussed above, is a screenshot illustrating various "from" and "then" clauses for different device types with respect to routing policy selection-based LR interconnect setup, in accordance with aspects of this disclosure.

Figure 11:
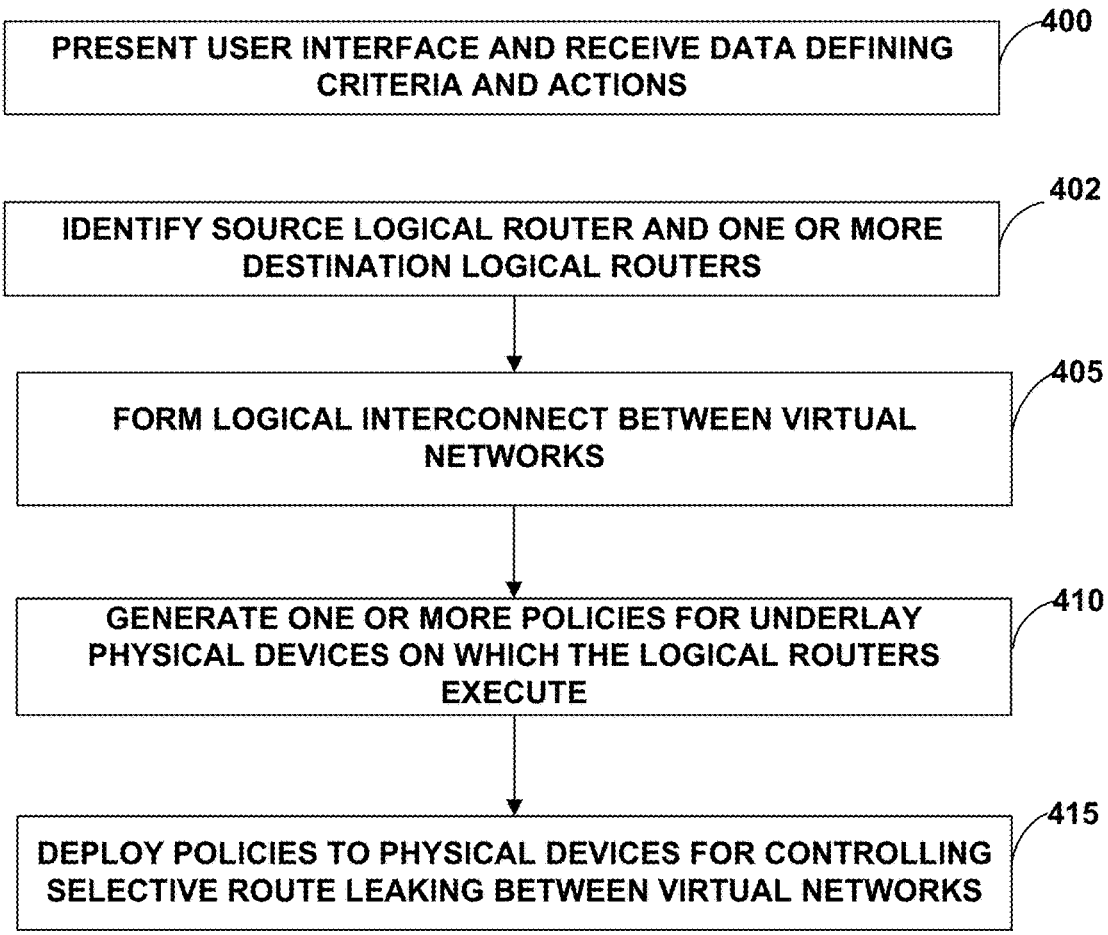
FIG. 11 is a flow diagram illustrating an example operation of a virtual network controller, in accordance with one or more techniques of this disclosure.

FIG. 11 is a flow diagram illustrating an example operation of a virtual network controller, in accordance with one or more techniques of this disclosure. For purposes of example, FIG. 11 is described with respect to virtual network controller 112.

As seen in the example of FIG. 11, virtual network controller 112 initially presents a user interface (e.g., GUI, API, etc.) to an administrator, network management system or other device, as described herein, and receives input specifying criteria and one or more actions for controlling route leaking between otherwise isolated logical networks (400). Based on the user input, the virtual network controller identifies a source logical router and at least one destination logical router implemented on one or more physical devices of a switch fabric, wherein the source logical router maintains routing information specifying routes for a first virtual network and the destination logical router maintains routing information specifying routes for a second virtual network (402). In some examples, virtual network controller may identify the logical routers in response to a selection input by the administrator selecting a graphical icon, picking devices from a list or even selecting virtual networks.

Next, the virtual network controller 112 may form, by the virtual network controller, a logical router interconnect between the source logical router and the destination logical router (405). In addition, virtual network controller 112 may form one or more policies defining one or more rules for controlling leaking of one or more of the routes through the logical router interconnect from the source logical router of the first virtual network to the destination logical router of the second virtual network (410). Virtual network controller 112 deploys the policies by pushing the policies to the one or more physical devices of the switch fabric for application of the policies by the physical devices to communications between the logical routers via the logical router interconnect, thereby providing automated mechanisms for configuring the physical devices to enforce fine grain control over route leaking from the virtual network in which the source logical router operates to the virtual network(s) of the one or more destination logical routers (415).

In some examples, when forming a logical router interconnect, virtual network controller 112 may define a routing information base (RIB) group that groups one or more routing tables of the source logical router and the destination logical router to form the RIB group. In such examples, the virtual network controller may construct the polices to include one or more rules specifying actions for the physical devices to apply, based on a community name or community member associated with the created RIB group, to routes leaked via the logical router interconnect. In other examples, the virtual network controller may, when forming a logical router interconnect, generate configuration data defining: (i) a virtual routing and forwarding (VRF) export process to be performed by the source logical router, and (ii) a VRF import to be performed by the destination logical router, and form the unidirectional policy to include one or more rules specifying criteria for marking particular routes and defining actions for the physical devices when applying the policies to routes communicated between the physical devices by the VRF export and VRF import processes.

EXAMPLES

Example 1: A method includes identifying, by a virtual network controller, a source logical router and a destination logical router implemented on one or more physical devices of a switch fabric, wherein the source logical router maintains routing information specifying routes for a first virtual network and the destination logical router maintains routing information specifying routes for a second virtual network; forming, by the virtual network controller, a logical router interconnect between the source LR and the destination LR; forming, by the virtual network controller, a unidirectional policy defining one or more rules for controlling communications within the LR interconnect; and pushing, by the virtual network controller, the unidirectional policy to the one or more physical devices of the switch fabric.

Example 2: The method of example 1, wherein the unidirectional policy for the communications within the LR interconnect represents a nested combination of intra-LR communication policies implemented by the source LR and destination LR with respect to the respective pairs of VNs.

Example 3: The method of example 1, further comprising receiving, by the virtual network controller, one or more routing policy attributes via a graphical user interface (GUI), wherein forming the unidirectional policy for the communications within the LR interconnect comprises forming the unidirectional policy using the routing policy attributes received via the GUI.

Example 4: The method of example 1, further comprising receiving, by the virtual network controller, an identification of two or more VNs of the respective pairs of VNS via a graphical user interface (GUI), wherein forming the unidirectional policy for the communications within the LR interconnect comprises forming the unidirectional policy by inheriting inter-VN routing policy information between the identified two or more VNs.

Example 5: The method of example 1, wherein the source LR and the destination LR reside on a single physical device of the one or more physical devices of the switch fabric, and wherein pushing the rules of the unidirectional policy comprises forming a routing information base (RIB) group between the source LR and the destination LR.

Example 6: The method of any of example 1, wherein the source LR and the destination LR reside on different physical devices of the switch fabric, and wherein pushing the rules of the unidirectional policy comprises: performing, by a device manager of the virtual network controller, a virtual routing and forwarding (VRF) export with respect to the source LR; and performing, by a device manager of the virtual network controller, a VRF import with respect to the destination LR.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer-readable media may include non-transitory computer-readable storage media and transient communication media. Computer readable storage media, which is tangible and non-transitory, may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described.

What is claimed is:

1. A method comprising:
identifying, by a virtual network controller, a source logical router and a destination logical router residing on the same physical device of a switch fabric, wherein the source logical router maintains routing information specifying routes for a first virtual network and the destination logical router maintains routing information specifying routes for a second virtual network;
forming, by the virtual network controller, a logical router interconnect between the source logical router and the destination logical router, wherein forming a logical router interconnect comprises defining a routing information base (RIB) group that groups one or more routing tables of the source logical router and the destination logical router to form the RIB group;
forming, by the virtual network controller, a unidirectional policy defining one or more rules for controlling leaking of one or more of the routes through the logical router interconnect from the source logical router to the destination logical router, wherein forming the unidirectional policy comprises determining one or more rules specifying actions for the physical device to apply, based on a community name or community member associated with the RIB group, to routes leaked via the logical router interconnect; and
pushing, by the virtual network controller, the unidirectional policy to the physical device of the switch fabric for application to communications through the logical router interconnect.

2. The method of claim 1, wherein the unidirectional policy for controlling the leaking of routes through the logical router interconnect represents a nested combination of intra-logical router communication policies implemented by the source logical router and the destination logical router.

3. The method of claim 1, further comprising receiving, by the virtual network controller, one or more routing policy attributes via a graphical user interface (GUI),
wherein forming the unidirectional policy for the communications within the logical router interconnect comprises forming the unidirectional policy using the routing policy attributes received via the GUI.

4. A method comprising:
identifying, by a virtual network controller, a source logical router and a destination logical router implemented on one or more physical devices of a switch fabric, wherein the source logical router maintains routing information specifying routes for a first virtual network and the destination logical router maintains routing information specifying routes for a second virtual network;
receiving, by the virtual network controller, an identification of the first virtual network and the second virtual network via a graphical user interface (GUI);
forming, by the virtual network controller, a logical router interconnect between the source logical router and the destination logical router;
forming, by the virtual network controller, a policy defining one or more rules for controlling leaking of one or more of the routes through the logical router interconnect from the source logical router to the destination logical router, wherein forming the policy for the communications within the logical router interconnect comprises forming the policy by inheriting inter-virtual network routing policy information between the identified first virtual network and second virtual network; and
pushing, by the virtual network controller, the policy to the one or more physical devices of the switch fabric for application to communications through the logical router interconnect.

5. A method comprising:
identifying, by a virtual network controller, a source logical router and a destination logical router implemented on one or more physical devices of a switch fabric, wherein the source logical router and the destination logical router reside on different physical devices of the switch fabric,
wherein the source logical router maintains routing information specifying routes for a first virtual network and the destination logical router maintains routing information specifying routes for a second virtual network;
forming, by the virtual network controller, a logical router interconnect between the source logical router and the destination logical router, wherein forming a logical router interconnect comprises generating configuration data defining: (i) a virtual routing and forwarding (VRF) export process to be performed by the source logical router, and (ii) a VRF import process to be performed by the destination logical router;
forming, by the virtual network controller, a unidirectional policy defining one or more rules for controlling leaking of one or more of the routes through the logical router interconnect from the source logical router to the destination logical router, wherein forming a unidirectional policy comprises forming the unidirectional policy to include one or more rules specifying criteria for marking particular routes and defining actions for the physical devices when applying the unidirectional policy to routes communicated between the physical devices by the VRF export and VRF import processes; and
pushing, by the virtual network controller, the unidirectional policy to the one or more physical devices of the switch fabric for application to communications through the logical router interconnect.

6. A network controller comprising:
a memory; and
processing circuitry configured to:
   identify a source logical router and a destination logical router implemented on one or more physical devices of a switch fabric, wherein the source logical router maintains routing information specifying routes for a first virtual network and the destination logical router maintains routing information specifying routes for a second virtual network;
   form a logical router interconnect between the source logical router and the destination logical router;
   form a unidirectional policy defining one or more rules for controlling leaking of one or more of the routes through the logical router interconnect from the source logical router of the first virtual network to the destination logical router of the second virtual network, wherein the source logical router and the destination logical router reside on the same physical device of the one or more physical devices of the switch fabric and the processing circuitry is configured to:
      define a routing information base (RIB) group that groups one or more routing tables of the source logical router and the destination logical router to form the RIB group,
      form the unidirectional policy to include one or more rules specifying actions for the physical devices to apply, based on a community name or community member associated with the RIB group, to routes leaked via the logical router interconnect; and
      push the unidirectional policy to the physical device of the switch fabric for application to communications through the logical router interconnect.

7. The network controller of claim 6, wherein the unidirectional policy for controlling the leaking of routes through the logical router interconnect represents a nested combination of intra-logical router communication policies implemented by the source logical router and the destination logical router.

8. The network controller of claim 6, wherein the processing circuitry is further configured to:
   receive one or more routing policy attributes via a graphical user interface (GUI); and
   form the unidirectional policy for the communications within the logical router interconnect using the routing policy attributes received via the GUI.

9. The network controller of claim 6, wherein the processing circuitry is further configured to:
   receive an identification of the first virtual network and the second virtual network via a graphical user interface (GUI); and
   form the unidirectional policy by inheriting inter-virtual network routing policy information between the identified first virtual network and second virtual network.

10. The network controller of claim 6,
   wherein the unidirectional policy comprises a first unidirectional policy,
   wherein the logical router interconnect comprises a first logical router interconnect,
   wherein a second source logical router and a second destination logical router reside on different physical devices of the switch fabric, and
   wherein the processing circuitry is further configured to:
      identify the second source logical router and the second destination logical router, wherein the second source logical router maintains routing information specifying routes for a third virtual network and the second destination logical router maintains routing information specifying routes for a fourth virtual network;
      generate configuration data defining: (i) a virtual routing and forwarding (VRF) export process to be performed by the second source logical router, and (ii) a VRF import process to be performed by the second destination logical router;
      form a second unidirectional policy defining one or more rules for controlling leaking of one or more of the routes through a second logical router interconnect from the second source logical router to the second destination logical router, wherein forming the second unidirectional policy comprises forming the second unidirectional policy to include one or more rules specifying criteria for marking particular routes and defining actions for the physical devices when applying the second unidirectional policy to routes communicated between the physical devices by the VRF export and VRF import processes; and
      push the second unidirectional policy to the one or more physical devices of the switch fabric for application to communications through the second logical router interconnect.

11. A computer-readable storage medium comprising instructions that configure processing circuitry of a network controller to:
   identify a source logical router and a destination logical router implemented on one or more physical devices of a switch fabric, wherein the source logical router maintains routing information specifying routes for a first virtual network and the destination logical router maintains routing information specifying routes for a second virtual network;
   form, by the virtual network controller, a logical router interconnect between the source logical router and the destination logical router;
   form, by the virtual network controller, a unidirectional policy defining one or more rules for controlling leaking of one or more of the routes through the logical router interconnect from the source logical router of the first virtual network to the destination logical router of the second virtual network, wherein the source logical router and the destination logical router reside on the same physical device of the one or more physical devices of the switch fabric;
   define a routing information base (RIB) group that groups one or more routing tables of the source logical router and the destination logical router to form the RIB group;
   form the unidirectional policy to include one or more rules specifying actions for the physical devices to apply, based on a community name or community member associated with the RIB group, to routes leaked via the logical router interconnect; and
   push the unidirectional policy to the physical device of the switch fabric for application to communications through the logical router interconnect.

12. The computer-readable storage medium of claim 11, wherein the unidirectional policy for controlling the leaking of routes through the logical router interconnect represents a nested combination of intra-logical router communication policies implemented by the source logical router and the destination logical router.

13. The computer-readable storage medium of claim 11, wherein the instructions configure the processing circuitry to:
  receive, by the virtual network controller, one or more routing policy attributes via a graphical user interface (GUI), and
  form the unidirectional policy using the routing policy attributes received via the GUI.

14. The computer-readable storage medium of claim 11, wherein the instructions configure the processing circuitry to:
  receive an identification of the first virtual network and the second virtual network via a graphical user interface (GUI), and
  form the unidirectional policy by inheriting inter-virtual network routing policy information between the identified first virtual network and second virtual network.

15. The computer-readable storage medium of claim 11, wherein the unidirectional policy comprises a first unidirectional policy,
  wherein the logical router interconnect comprises a first logical router interconnect,
  wherein a second source logical router and a second destination logical router reside on different physical devices of the switch fabric, and
  wherein the instructions configure the processing circuitry to:
    identify the second source logical router and the second destination logical router, wherein the second source logical router maintains routing information specifying routes for a third virtual network and the second destination logical router maintains routing information specifying routes for a fourth virtual network;
    generate configuration data defining: (i) a virtual routing and forwarding (VRF) export process to be performed by the second source logical router, and (ii) a VRF import process to be performed by the second destination logical router;
    form a second unidirectional policy defining one or more rules for controlling leaking of one or more of the routes through a second logical router interconnect from the second source logical router of the third virtual network to the second destination logical router of the fourth virtual network, wherein forming a second unidirectional policy comprises forming the second unidirectional policy to include one or more rules specifying criteria for marking particular routes and defining actions for the physical devices when applying the second unidirectional policy to routes communicated between the physical devices by the VRF export and VRF import processes; and
    push the second unidirectional policy to the one or more physical devices of the switch fabric for application to communications through the second logical router interconnect.

\* \* \* \* \*